US011269249B2

(12) United States Patent
Okada et al.

(10) Patent No.: US 11,269,249 B2
(45) Date of Patent: Mar. 8, 2022

(54) OPTICAL SYSTEM, PROJECTION APPARATUS, AND IMAGING APPARATUS

(71) Applicant: FUJIFILM Corporation, Tokyo (JP)

(72) Inventors: Kazuyoshi Okada, Saitama (JP); Kenkichi Hayashi, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 16/795,546

(22) Filed: Feb. 19, 2020

(65) Prior Publication Data
US 2020/0192210 A1  Jun. 18, 2020

Related U.S. Application Data

(63) Continuation of application No. PCT/JP2018/030304, filed on Aug. 14, 2018.

(30) Foreign Application Priority Data

Sep. 28, 2017 (JP) .............................. JP2017-188593

(51) Int. Cl.
*G03B 21/26* (2006.01)
*G03B 21/28* (2006.01)
(Continued)

(52) U.S. Cl.
CPC ............. *G03B 21/26* (2013.01); *G03B 21/28* (2013.01); *G02B 13/16* (2013.01); *G02B 27/64* (2013.01); *G03B 21/2033* (2013.01)

(58) Field of Classification Search
CPC ........ G03B 21/26; G03B 21/28; G03B 35/00; G03B 35/08; G03B 35/10; G03B 35/12;
(Continued)

(56) References Cited

U.S. PATENT DOCUMENTS 5,548,348 A * 8/1996 Kawabata ............ H04N 5/7441
                                          348/756
6,363,225 B1 * 3/2002 Sugawara ............ H04N 13/211
                                          396/331
(Continued)

FOREIGN PATENT DOCUMENTS

CN       1683983       10/2005
CN       1926466        3/2007
(Continued)

OTHER PUBLICATIONS

"International Search Report (Form PCT/ISA/210) of PCT/JP2018/030304," dated Nov. 20, 2018, with English translation thereof, pp. 1-5.
(Continued)

*Primary Examiner* — Bao-Luan Q Le
(74) *Attorney, Agent, or Firm* — JCIPRNET

(57) ABSTRACT

The optical system having an imaging lens that images a first-plane and a second-plane which are discontinuous includes: a first-optical-system that images the first-plane; a second-optical-system that images the second-plane; and a common-optical-system that forms a subject image, which is incident through the first-optical-system, on the first-light-receiving-region of the image sensor and forms a subject image, which is incident through the second-optical-system, on the second-light-receiving-region of the image sensor. In the optical system, an angle of view, at which imaging is performed by the first-optical-system and the common-optical-system, overlaps with an angle of view, at which imaging is performed by the second-optical-system and the common-optical-system. The optical system includes a first focus adjustment unit that adjusts the focus of the optical system composed of the first-optical-system and the common-optical-system and a second focus adjustment unit that
(Continued)

adjusts the focus of the optical system composed of the second-optical-system and the common-optical-system.

20 Claims, 20 Drawing Sheets

(51) Int. Cl.
  *G02B 13/16* (2006.01)
  *G02B 27/64* (2006.01)
  *G03B 21/20* (2006.01)
(58) Field of Classification Search
  CPC ...... G02B 30/34; G02B 30/35; G02B 27/106; G02B 13/16; G02B 27/64; G02B 21/2033
  See application file for complete search history.

(56) References Cited

U.S. PATENT DOCUMENTS

| | | | |
|---|---|---|---|
| 6,424,437 B1* | 7/2002 | Popovich | G02B 5/32 348/E5.137 |
| 6,493,032 B1* | 12/2002 | Wallerstein | G02B 13/06 348/335 |
| 6,686,988 B1* | 2/2004 | Sugawara | G02B 30/24 355/22 |
| 6,734,911 B1 | 5/2004 | Lyons | |
| 6,885,509 B2 | 4/2005 | Wallerstein et al. | |
| 7,006,303 B2 | 2/2006 | Imoto | |
| 7,408,703 B2 | 8/2008 | Matsuki et al. | |
| 8,254,038 B2 | 8/2012 | Togino | |
| 8,269,902 B2 | 9/2012 | Plut | |
| 8,331,039 B2 | 12/2012 | Mizusawa | |
| 8,425,049 B2 | 4/2013 | Hirata et al. | |
| 8,690,349 B2 | 4/2014 | Hirata et al. | |
| 8,922,634 B2 | 12/2014 | Namii | |
| 9,010,943 B2 | 4/2015 | Shimatani et al. | |
| 9,395,611 B2 | 7/2016 | Nishikawa et al. | |
| 9,429,832 B2 | 8/2016 | Hirata et al. | |
| 9,538,070 B2 | 1/2017 | Okigawa | |
| 9,575,401 B2 | 2/2017 | Nishikawa et al. | |
| 10,536,617 B2 | 1/2020 | Liang et al. | |
| 2001/0004298 A1* | 6/2001 | Kobayashi | G03B 35/00 359/462 |
| 2001/0010555 A1 | 8/2001 | Driscoll, Jr. | |
| 2001/0015847 A1* | 8/2001 | Sugawara | H04N 13/296 359/462 |
| 2004/0257539 A1 | 12/2004 | Peterson et al. | |
| 2005/0185050 A1* | 8/2005 | Ohashi | H04N 13/218 348/50 |
| 2005/0259223 A1* | 11/2005 | Hopman | G03B 21/28 353/13 |
| 2007/0008503 A1* | 1/2007 | Choi | G06Q 30/02 353/98 |
| 2007/0146652 A1 | 6/2007 | Peterson et al. | |
| 2008/0074625 A1* | 3/2008 | Lai | G03B 21/28 353/82 |
| 2009/0128780 A1* | 5/2009 | Schuck | H04N 13/337 353/20 |
| 2010/0141856 A1* | 6/2010 | Schuck | H04N 13/337 349/9 |
| 2010/0182571 A1* | 7/2010 | Nishikawa | G03B 35/26 353/20 |
| 2010/0253860 A1* | 10/2010 | Nishigaki | H04N 9/3147 348/744 |
| 2011/0069235 A1 | 3/2011 | Fujisaki et al. | |
| 2012/0019781 A1* | 1/2012 | Kuhlman | G02B 27/0101 353/13 |
| 2012/0057134 A1* | 3/2012 | Huang | G03B 35/22 353/8 |
| 2012/0170108 A1* | 7/2012 | Kuhlman | G02F 1/133524 359/298 |
| 2012/0320165 A1* | 12/2012 | Schuck | G03B 35/22 348/49 |
| 2013/0100527 A1* | 4/2013 | Chung | G03B 21/14 359/449 |
| 2014/0092366 A1* | 4/2014 | Chen | G03B 21/28 353/20 |
| 2014/0104580 A1* | 4/2014 | Tsai | G03B 21/28 353/30 |
| 2014/0118701 A1* | 5/2014 | Lee | H04N 9/3147 353/34 |
| 2015/0002646 A1 | 1/2015 | Namii | |
| 2015/0022783 A1* | 1/2015 | Lee | G03B 21/2033 353/20 |
| 2015/0042965 A1 | 2/2015 | Peterson et al. | |
| 2015/0049313 A1* | 2/2015 | Chen | G03B 33/06 353/99 |
| 2016/0070158 A1 | 3/2016 | Peterson et al. | |
| 2016/0088204 A1* | 3/2016 | Liang | A61B 1/0615 348/68 |
| 2016/0341943 A1 | 11/2016 | Peterson et al. | |
| 2016/0342075 A1 | 11/2016 | Peterson et al. | |
| 2019/0011719 A1* | 1/2019 | Lee | G02B 27/285 |
| 2019/0113726 A1 | 4/2019 | Peterson et al. | |

FOREIGN PATENT DOCUMENTS

| | | |
|---|---|---|
| CN | 101363957 | 2/2009 |
| CN | 101688970 | 3/2010 |
| CN | 101776839 | 7/2010 |
| CN | 101895693 | 11/2010 |
| CN | 102025950 | 4/2011 |
| CN | 103597405 | 2/2014 |
| CN | 103775869 | 5/2014 |
| CN | 105051600 | 11/2015 |
| JP | 2001154097 | 6/2001 |
| JP | 2003510666 | 3/2003 |
| JP | 2009260531 | 11/2009 |
| JP | 2011075915 | 4/2011 |
| JP | 2011197217 | 10/2011 |
| JP | 2012529223 | 11/2012 |
| JP | 2015139087 | 7/2015 |
| JP | 2016521607 | 7/2016 |
| WO | 03042743 | 5/2003 |
| WO | 2005078502 | 8/2005 |
| WO | 2009008536 | 1/2009 |
| WO | 2012002148 | 1/2012 |
| WO | 2017061263 | 4/2017 |

OTHER PUBLICATIONS

"International Preliminary Report on Patentability (Form PCT/IPEA/409) of PCT/JP2018/030304," completed on Aug. 14, 2019, with English translation thereof, pp. 1-10.

Office Action of China Counterpart Application, with English translation thereof, dated May 28, 2021, pp. 1-25.

Office Action of China Counterpart Application, with English translation thereof, dated Sep. 28, 2021, pp. 1-9.

* cited by examiner

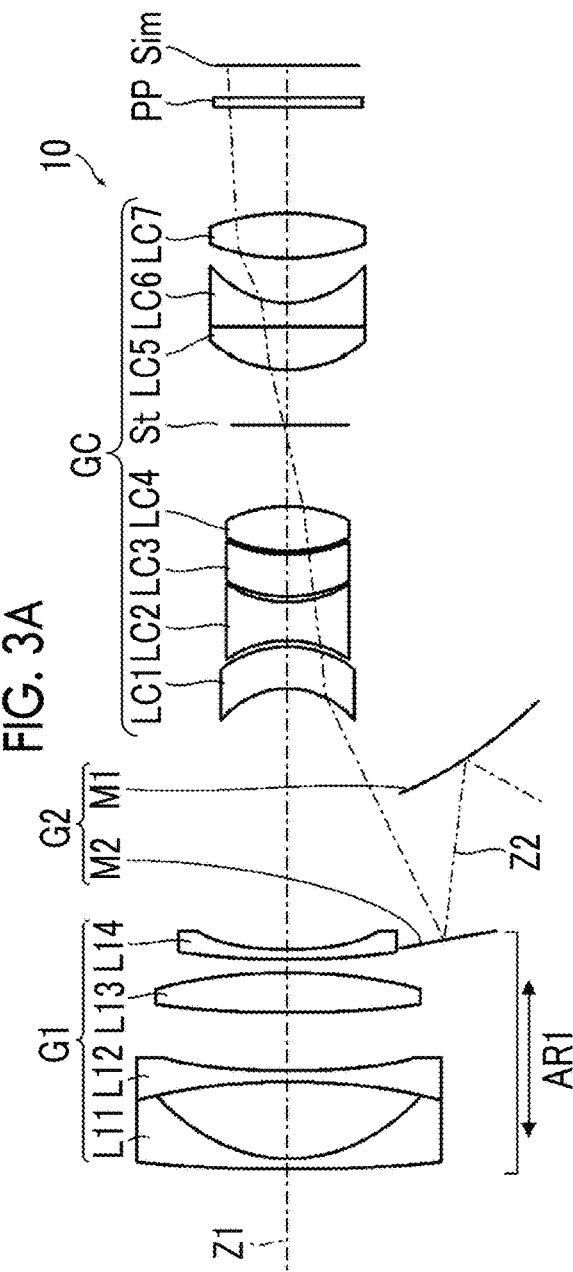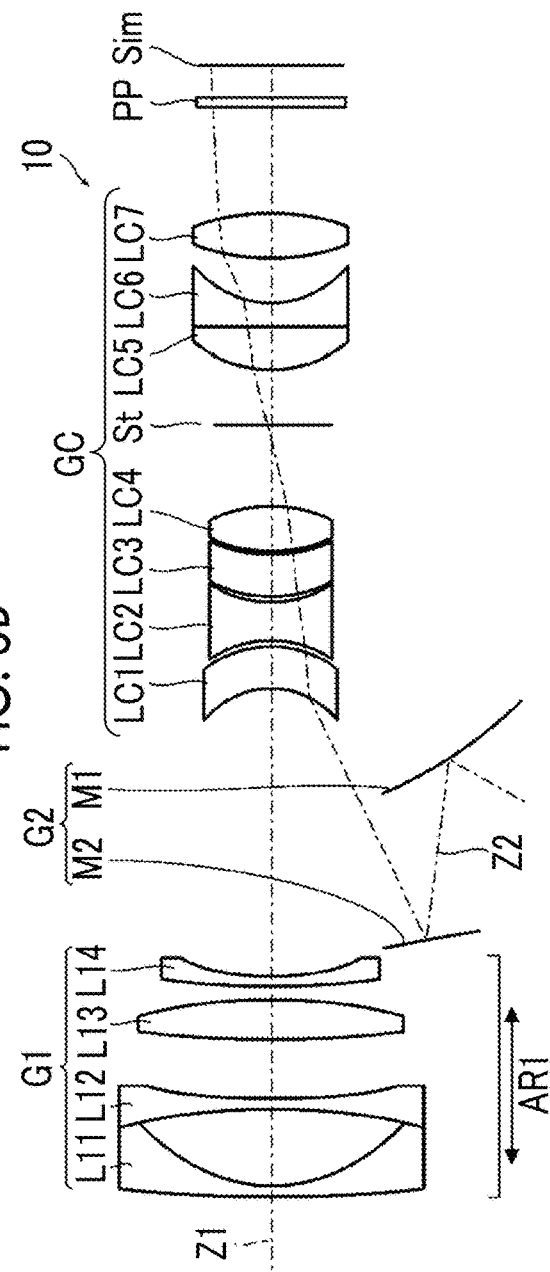

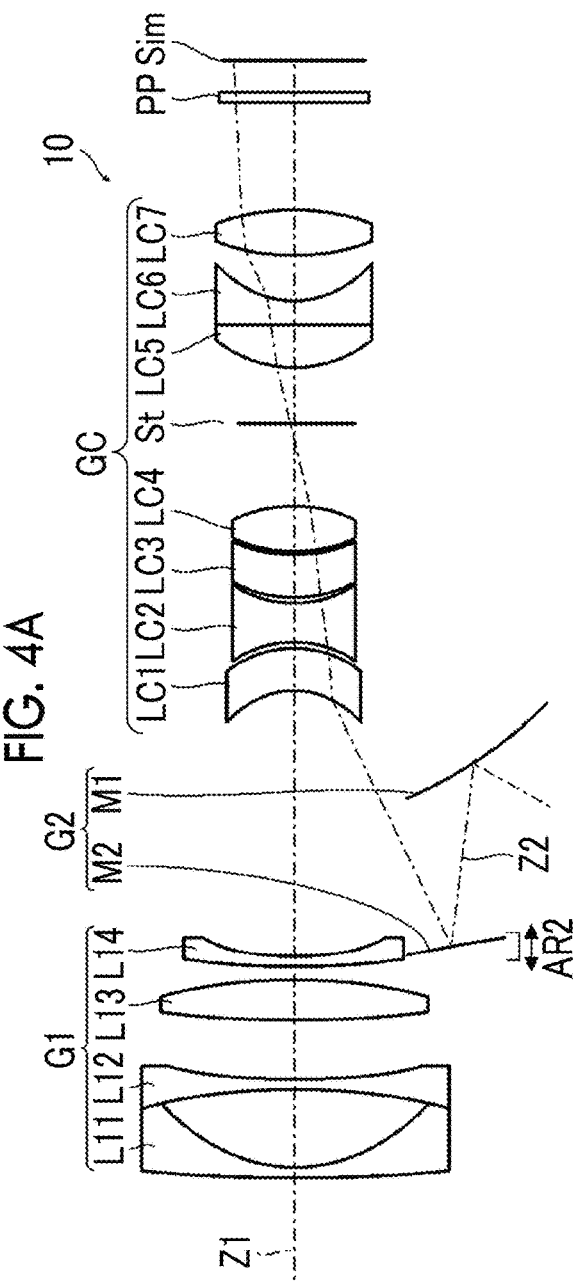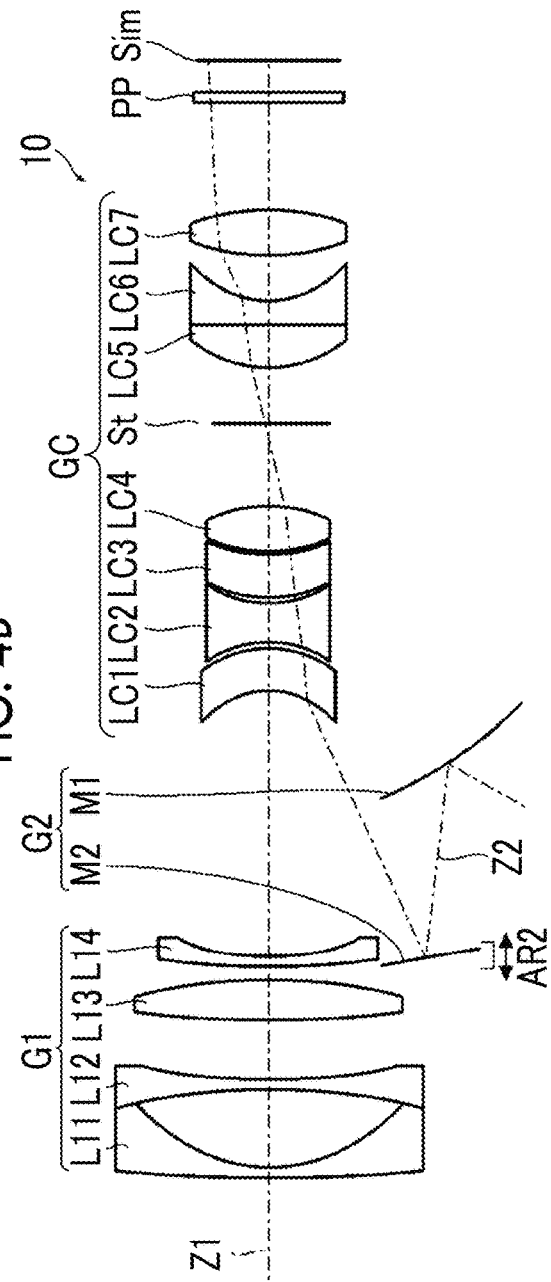

FIG. 6A
LENS DATA OF FIRST OPTICAL SYSTEM G1 (Nd AND $\nu$d IS BASED ON D LINE)

| SURFACE NUMBER | RADIUS OF CURVATURE | SURFACE DISTANCE | Nd | $\nu$d |
|---|---|---|---|---|
| 1 | 210.07576 | 1.000 | 1.67664 | 57.67 |
| 2 | 15.50622 | 7.002 | | |
| 3 | -55.23064 | 1.000 | 1.61800 | 63.33 |
| 4 | 61.43041 | 5.156 | | |
| 5 | 85.00059 | 3.973 | 1.76627 | 26.69 |
| 6 | -42.61954 | 1.157 | | |
| 7 | 84.29859 | 1.000 | 1.61800 | 63.33 |
| 8 | 21.41498 | 23.657 | | |

FIG. 6B
LENS DATA OF SECOND OPTICAL SYSTEM G2

| SURFACE NUMBER | RADIUS OF CURVATURE | SURFACE DISTANCE | Y AXIS DIRECTION SHIFT | ANGLE OF ROTATION AROUND X AXIS |
|---|---|---|---|---|
| 1 (REFLECTIVE SURFACE) | 40.98861 | -6.402 | 0.000 | 7.806 |
| 2 (REFLECTIVE SURFACE) | -279.97042 | 18.540 | -64.657 | 0.000 |

FIG. 6C
LENS DATA OF COMMON OPTICAL SYSTEM GC (Nd AND $\nu$d IS BASED ON D LINE)

| SURFACE NUMBER | RADIUS OF CURVATURE | SURFACE DISTANCE | Nd | $\nu$d |
|---|---|---|---|---|
| 1 | -8.00436 | 4.000 | 1.74922 | 53.08 |
| 2 | -9.67832 | 0.201 | | |
| 3 | -16.90341 | 4.000 | 1.60799 | 37.20 |
| 4 | 11.02148 | 0.390 | | |
| 5 | 11.60425 | 4.000 | 1.55714 | 45.09 |
| 6 | 15.47027 | 0.323 | | |
| 7 | 21.74900 | 4.000 | 1.85000 | 43.00 |
| 8 | -19.44649 | 7.579 | | |
| 9(St) | ∞ | 5.092 | | |
| 10 | 10.98544 | 4.010 | 1.61800 | 63.33 |
| 11 | -282.60226 | 1.963 | 1.74014 | 28.01 |
| 12 | 8.68456 | 4.222 | | |
| 13 | 16.15174 | 4.000 | 1.62448 | 60.21 |
| 14 | -24.66631 | 10.000 | | |
| 15 | ∞ | 1.000 | 1.51633 | 64.14 |
| 16 | ∞ | 3.060 | | |

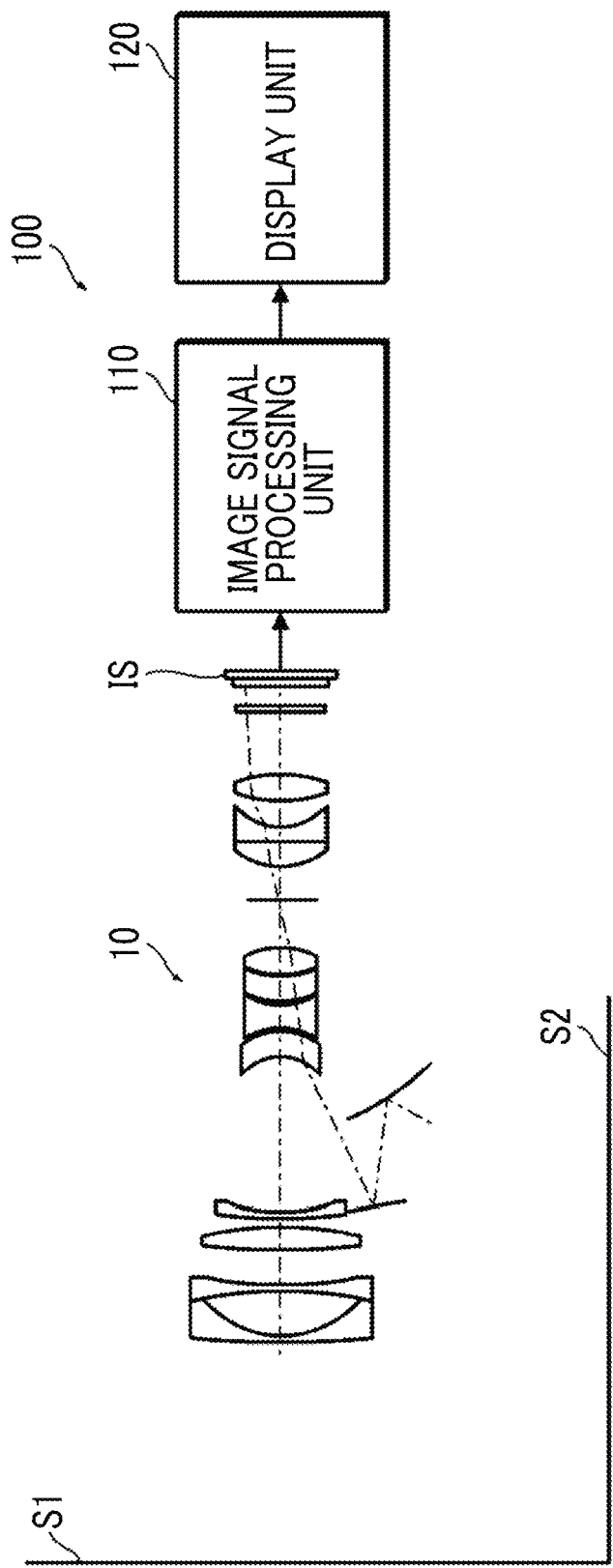

OPTICAL SYSTEM, PROJECTION APPARATUS, AND IMAGING APPARATUS

CROSS-REFERENCE TO RELATED APPLICATIONS

This application is a Continuation of PCT International Application No. PCT/JP2018/030304 filed on Aug. 14, 2018, which claims priority under 35 U.S.C § 119(a) to Japanese Patent Application No. 2017-188593 filed on Sep. 28, 2017. Each of the above application(s) is hereby expressly incorporated by reference, in its entirety, into the present application.

BACKGROUND OF THE INVENTION

1. Field of the Invention

The present invention relates to an optical system, a projection apparatus, and an imaging apparatus. In particular, the present invention relates to an optical system that performs projection onto discontinuous planes, a projection apparatus that uses the optical system, an optical system that images a subject on discontinuous planes, and an imaging apparatus that uses the optical system.

2. Description of the Related Art

Projection mapping is known as a technique for projecting an image onto the surface of a three-dimensional object such as a building. In the projection mapping, a projection apparatus is usually provided for each surface onto which an image is projected. For example, in a case where projection mapping is performed using two orthogonal planes, two projection apparatuses are used. It is the same for imaging, and in a case of simultaneously imaging in different directions, an imaging apparatus is provided for each imaging direction.

JP2012-529223A describes a projection apparatus that comprises a plurality of projection units capable of individually projecting an image and adjusts the direction of each projection unit so as to perform projection onto a plurality of planes. JP2009-260531A and JP2015-139087A describe, as a method of projecting images onto two orthogonal planes through one projection apparatus, a method of projecting an image without distortion onto each surface by performing trapezoidal correction or the like on the image projected onto each surface. JP2011-075915A describes an optical system capable of simultaneously imaging the front and sides.

SUMMARY OF THE INVENTION

However, the projection apparatus of JP2012-529223A requires a plurality of projection units, and thus has a problem in that the size of the apparatus becomes large. In addition, the methods of JP2009-260531A and JP2015-139087A have a problem in that the continuity of images is impaired because a gap is generated between images projected onto two surfaces. Similarly, the optical system of JP2011-075915A has a problem in that a blind spot is generated between the front imaging region and the side imaging region.

The present invention has been made in view of such circumstances, and provides an optical system, a projection apparatus, and an imaging apparatus capable of performing projection onto discontinuous planes without a gap and capable of imaging the discontinuous plane without a blind spot.

Means for Solving the Above Problems are as Follows (1) An optical system which forms subject images of a first plane and a second plane, which are discontinuous, on a continuous first light receiving region and a continuous second light receiving region, which are different, in one image sensor or enlarges projection images displayed in a continuous first display region and a continuous second display region, which are different, in one image display element so as to project the projection images onto the first plane and the second plane, the optical system comprising: a first optical system that performs imaging or projection on the first plane; a second optical system that performs imaging or projection on the second plane, includes two reflective optical elements, where at least one of the reflective optical elements has a power; a common optical system that forms the subject image, which is incident through the first optical system, on the continuous first light receiving region of the image sensor and forms the subject image, which is incident through the second optical system, on the continuous second light receiving region of the image sensor or that causes the projection image displayed in the continuous first display region of the image display element to be incident into the first optical system and causes the projection image displayed in the continuous second display region of the image display element to be incident into the second optical system; a first focus adjustment unit that moves at least a part of the optical elements of the first optical system; and a second focus adjustment unit that moves the reflective optical element having a power of the second optical system. A first angle of view, at which imaging or projection is performed through the first optical system and the common optical system, overlap with a second angle of view, at which imaging or projection is performed through the second optical system and the common optical system.

The optical system of this aspect includes the first optical system, the second optical system, and the common optical system. The first optical system is an optical system that performs imaging and projection on the first plane. The second optical system is an optical system that performs imaging and projection on the second plane. The common optical system is an optical system that forms a subject image, which is incident through the first optical system, on the continuous first light receiving region of the image sensor and forms a subject image, which is incident through the second optical system, on the continuous second light receiving region of the image sensor in a case where the optical system is applied to an imaging lens. Further, the common optical system is an optical system that causes the projection image displayed in the continuous first display region of the image display element to be incident into the first optical system and causes the projection image displayed in the continuous second display region of the image display element to be incident into the second optical system in a case where the optical system is applied to a projection lens. By providing the first optical system, the second optical system, and the common optical system, in a case where the optical system is applied to an imaging lens, it is possible to form the subject images of the first plane and the second plane, which are discontinuous, on the continuous first light receiving region and the continuous second light receiving region, which are different, in one image sensor. In addition, in a case where the optical system is applied to a projection lens, it is possible to project the projection images onto the first plane and the second plane, which are discontinuous, by enlarging projection images displayed in a continuous first display region and a continuous second display region, which are different, in one image display element.

In addition, the optical system of this aspect is configured such that the first angle of view, at which imaging or projection is performed through the first optical system and the common optical system, overlap with the second angle of view, at which imaging or projection is performed through the second optical system and the common optical system. Thereby, in a case where the optical system is applied to an imaging lens, the discontinuous planes can be imaged without a blind spot. Further, in a case where the optical system is applied to a projection lens, the images can be projected onto the discontinuous planes without a gap.

Further, the optical system of this aspect comprises a first focus adjustment unit and a second focus adjustment unit. The first focus adjustment unit adjusts the focus of the optical system composed of the first optical system and the common optical system by moving at least a part of the optical elements of the first optical system. The second focus adjustment unit adjusts the focus of the optical system composed of the second optical system and the common optical system by moving the reflective optical element having a power among the two reflective optical elements composing the second optical system. Thereby, each subject image of the first plane and the second plane can be sharply captured. In addition, a sharp image can be projected onto each of the first plane and the second plane.

Here, the term "discontinuous" means that the first plane and the second plane are not on the same plane. Therefore, even in a case where the first plane and the second plane are connected, the angles thereof may be different from each other. In this case, the two planes are discontinuous. In addition, even in a case where the first plane and the second plane are parallel to each other, the planes may be arranged in the front-rear direction. In this case, the two planes are discontinuous.

(2) The optical system of (1), in which assuming that an angle, which is formed between an end of the second plane on an overlapping side and an optical axis of the first optical system and the common optical system, is ω12 and that an angle, which is formed between an end of the first plane on the overlapping side and an axis orthogonal to the optical axis, is ω21, a condition of ω12−ω21>π/2 is satisfied.

According to this aspect, the optical system is configured so as to satisfy the condition of ω12+ω21>π/2. The angle, which is formed between the end of the second plane on the overlapping side and an optical axis of the first optical system and the common optical system, is ω12. The angle, which is formed between the end of the first plane on the overlapping side and the axis orthogonal to the optical axis, is ω21. Thereby, an optical system in which the first angle of view and the second angle of view overlap can be configured.

(3) The optical system of (1) or (2), in which the reflective optical element moved by the second focus adjustment unit has a convex reflective surface.

According to this aspect, the reflective optical element that is moved by the second focus adjustment unit is composed of a reflective optical element having a convex reflective surface. As a result, the second angle of view can be wide angle.

(4) The optical system of any one of (1) to (3), further comprising an angle adjustment unit that adjusts an angle of at least one of the two reflective optical elements.

(5) The optical system of any one of (1) to (4), in which an angle formed between the first plane and the second plane is less than π.

According to this aspect, the optical system is configured as an optical system that performs projection or imaging on two planes having different angles. More specifically, the optical system is configured as an optical system that performs projection or imaging on two planes that intersect at an angle less than 180°. For example, the optical system is configured as an optical system that performs projection or imaging on two planes that intersect at an obtuse angle.

(6) The optical system of (5), in which an angle formed between the first plane and the second plane is π/2.

According to this aspect, the optical system is configured to perform projection or imaging on two perpendicular planes. Here, the range of π/2 includes a range substantially recognized as π/2. That is, the range includes a case where the angle formed by the first plane and the second plane is approximately π/2.

(7) The optical system of any one of (1) to (6), in which the second optical system is disposed at each of a plurality of positions which are rotationally symmetric about an optical axis of the first optical system and the common optical system as a rotationally symmetric center.

(7') The optical system of any one of (2) to (7), in which, the optical axis of the first optical system and the common optical system referring to as a first optical axis, the second optical system has a second optical axis different from the first optical axis.

(7") The optical system of (7'), in which the first focus adjustment unit and the second focus adjustment unit perform focus adjustment by moving along the first optical axis and the second optical axis, respectively.

(7''') The optical system of any one of (1) to (7"), in which the first angle of view, at which imaging or projection is performed through the first optical system and the common optical system, partially overlap with the second angle of view, at which imaging or projection is performed through the second optical system and the common optical system.

According to aspect (7), a plurality of second optical systems are provided. Thereby, it is possible to perform projection or imaging on three or more planes. Each of the second optical systems is disposed at a plurality of positions which are rotationally symmetric about the optical axis of the first optical system and the common optical system as the rotationally symmetric center. For example, the second optical systems are disposed at right and left positions which are rotationally symmetric about the optical axis of the first optical system and the common optical system as the rotationally symmetric center. Thereby, it is possible to perform projection or imaging on a first plane and both right and left planes thereof. Further, for example, the second optical systems are disposed at upper, lower, right, and left positions which are rotationally symmetric about the optical axis of the first optical system and the common optical system as the rotationally symmetric center. Thereby, it is possible to perform projection or imaging on the first plane and four planes of the top, bottom, left, and right thereof.

According to the aspect (7'), the second optical system has an optical axis different from the optical axis of the first optical system and the common optical system. Thereby, it is possible to form the subject images of the first plane and the second plane, which are discontinuous, on the continuous first light receiving region and the continuous second light receiving region, which are different, in one image sensor. In addition it is possible to enlarge projection images displayed in the continuous first display region and the continuous second display region, which are different, in one image display element so as to project the projection images onto the first plane and the second plane, which are discontinuous.

According to the aspect (7"), the first focus adjustment unit, moving at least a part of the optical elements of the first optical system, and the second focus adjustment unit, moving the reflective optical element having a power of the second optical system, perform focus adjustment by moving respectively along the first optical axis of the first optical system and the common optical system and the second optical axis of the second optical system, where the second optical axis is different from the first optical axis. Thereby, each subject image of the first plane and the second plane can be sharply captured by respectively adjusting the focus of the optical system composed of the first optical system and the common optical system and the focus of the optical system composed of the second optical system and the common optical system. In addition, a sharp image can be projected onto each of the first plane and the second plane.

According to aspect (7"), the first angle of view, at which imaging or projection is performed through the first optical system and the common optical system, partially overlap with the second angle of view, at which imaging or projection is performed through the second optical system and the common optical system. Thereby, it is possible to form the subject images of the first plane and the second plane, which are discontinuous, in different regions of the continuous first light receiving region and the continuous second light receiving region in one image sensor, and it is possible that the formed subject images of the first plane and the second plane, which are discontinuous, have portions that partially overlap with each other. In addition, it is possible to enlarge projection images displayed in the continuous first display region and the continuous second display region, which are different, in one image display element so as to project the projection images onto the first plane and the second plane, which are discontinuous, and it is possible that the projected projection images displayed in the continuous first display region and the continuous second display region, which are different, have portions that partially overlap with each other. Thereby, in a case where the optical system is applied to an imaging lens, the discontinuous planes can be imaged without a blind spot, further, in a case where the optical system is applied to a projection lens, the images can be projected onto the discontinuous planes without a gap.

(8) A projection apparatus comprising: the optical system of any one of (1) to (7'"); an image display element; a projection image acquisition unit that acquires images to be projected; and a projection image generation unit that generates an image, in which the projection image projected onto the first plane is displayed in the continuous first display region and the projection image projected onto the second plane is displayed in the continuous second display region, from the images acquired by the projection image acquisition unit in a case where the image display element performs display.

According to this aspect, any one of the optical systems (1) to (7'") is applied to a projection lens of the projection apparatus. In addition to the optical system and the image display element, the projection apparatus may comprise the projection image acquisition unit that acquires images to be projected, and the projection image generation unit that generates a projection image from the acquired image. The projection image generation unit generates an image, in which the projection image projected onto the first plane is displayed in the first display region and the projection image projected onto the second plane is displayed in the second display region, in a case where the image display element performs display.

(9) The projection apparatus of (8), in which the projection image generation unit generates an image, in which the projection image displayed in the continuous first display region and the projection image displayed in the continuous second display region are continuous at a boundary between the first plane and the second plane, in a case where the optical system performs projection onto the first plane and the second plane.

According to this aspect, in a case where the optical system performs projection onto the first plane and the second plane, a continuous image at the boundary between the first plane and the second plane is generated. Thereby, an image can be projected without a gap.

(10) An imaging apparatus comprising: the optical system of any one of (1) to (7'"); the image sensor; and a captured image acquisition unit that acquires images formed in the continuous first light receiving region and the continuous second light receiving region of the image sensor.

According to this aspect, the optical systems (1) to (7'") are applied to an imaging lens of the imaging apparatus. In addition to the optical system and the image sensor, the imaging apparatus may comprise a captured image acquisition unit that acquires the images formed in the first light receiving region and the second light receiving region of the image sensor.

(11) The imaging apparatus of (10), further comprising a composite image generation unit that generates a composite image obtained by combining the image formed on the continuous first light receiving region and the image formed on the continuous second light receiving region.

According to this aspect, the composite image generation unit is further provided. The composite image generation unit generates a composite image obtained by joining the image formed in the first light receiving region and the image formed in the second light receiving region. The image formed on the first light receiving region and the image formed on the second light receiving region have portions that overlap with each other. Therefore, it is possible to combine images using the overlapping portions.

According to the present invention, discontinuous planes can be projected without a gap, and discontinuous planes can be imaged without a blind spot.

BRIEF DESCRIPTION OF THE DRAWINGS

FIGS. 3A and 3B show a conceptual diagram of focus adjustment performed by a first focus adjustment unit.

FIGS. 4A and 4B show a conceptual diagram of focus adjustment performed by a second focus adjustment unit.

FIGS. 6A to 6C show lens data of the imaging lens.

FIG. 7 is a diagram showing a schematic configuration of an imaging apparatus.

DESCRIPTION OF THE PREFERRED EMBODIMENTS

Hereinafter, preferred embodiments for carrying out the present invention will be described in detail with reference to the accompanying drawings.

♦Imaging Lens♦

[Overview]

First, an overview of an imaging lens to which the present invention is applied will be described.

Figure 1:
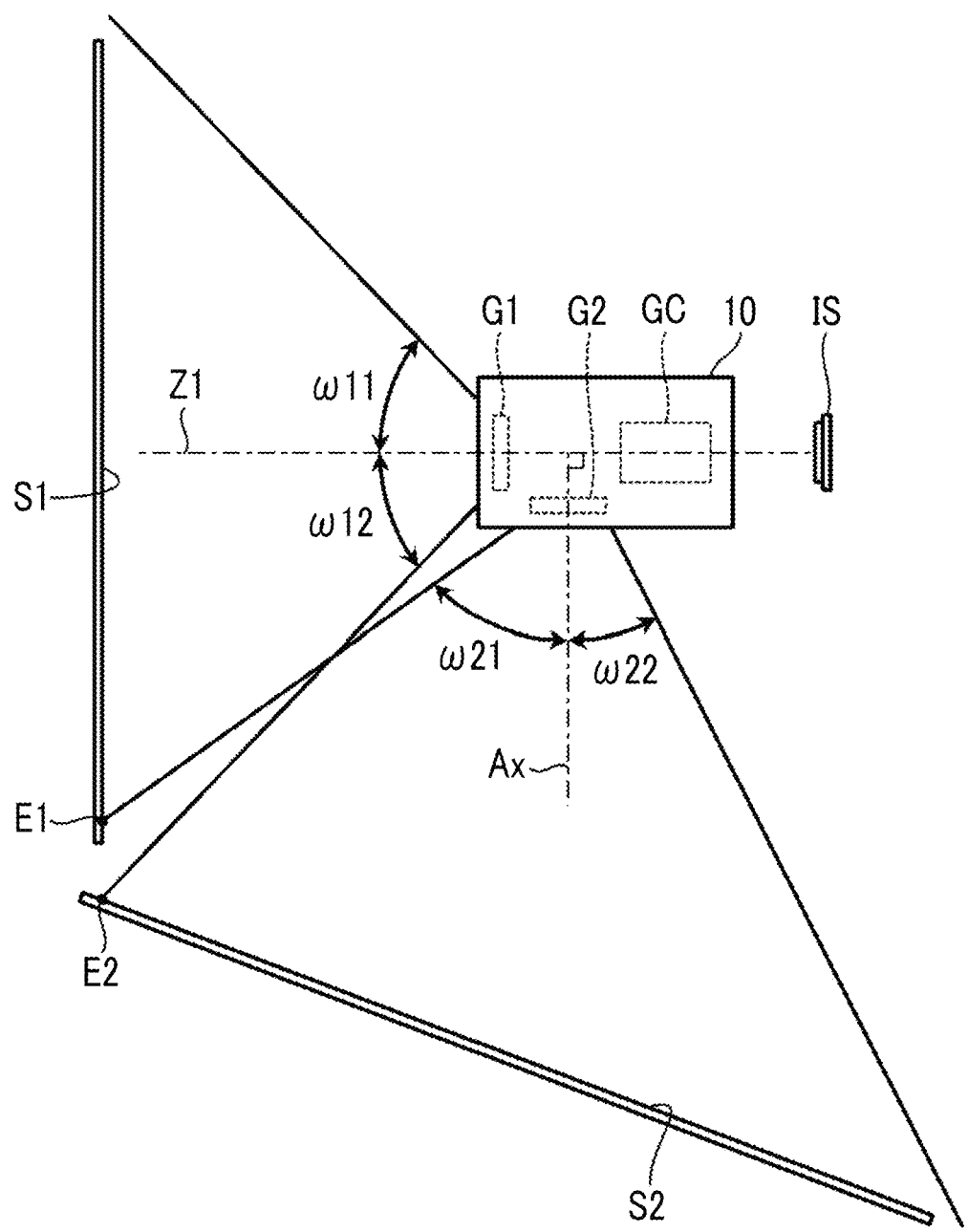
FIG. 1 is a diagram showing an overview of functions of an imaging lens.

FIG. 1 is a diagram showing an overview of functions of the imaging lens.

As shown in FIG. 1, the imaging lens 10 of the present embodiment is configured as a lens that forms subject images of two discontinuous planes on different light receiving regions of one image sensor.

Here, the term "two discontinuous planes" means that the two planes are not on the same plane. Therefore, even in a case where the two planes are connected, the two planes are discontinuous in the case where the angles thereof are different from each other. In addition, even in a case where the two planes are parallel to each other, the two planes are discontinuous. One plane is set as a first plane S1, and the other plane is set as a second plane S2. The light receiving region where the subject image of the first plane S1 is formed is set as a first light receiving region, and the light receiving region where the subject image of the second plane S2 is formed is set as a second light receiving region.

The imaging lens 10 includes a first optical system G1 that images the first plane S1, a second optical system G2 that images the second plane S2, and a common optical system GC that forms a subject image, which is incident through the first optical system G1, on the first light receiving region of the image sensor IS and forms a subject image, which is incident through the second optical system G2, on the second light receiving region of the image sensor IS. The angle of view at which imaging is performed by the first optical system G1 and the common optical system GC overlap with the angle of view at which imaging is performed by the second optical system G2 and the common optical system GC. Thereby, the first plane S1 and the second plane S2 can be imaged without a blind spot.

Further, the imaging lens 10 comprises a first focus adjustment unit that adjusts the focus of an optical system composed of the first optical system G1 and the common optical system GC, and a second that adjusts the focus of an optical system composed of the second optical system G2 and the common optical system GC. Thereby, sharp images can be captured with respect to the first plane S1 and the second plane S2 by individually adjusting the focuses.

[Configuration]

Next, an example of a configuration of an imaging lens to which the present invention is applied will be described.

Figure 2:
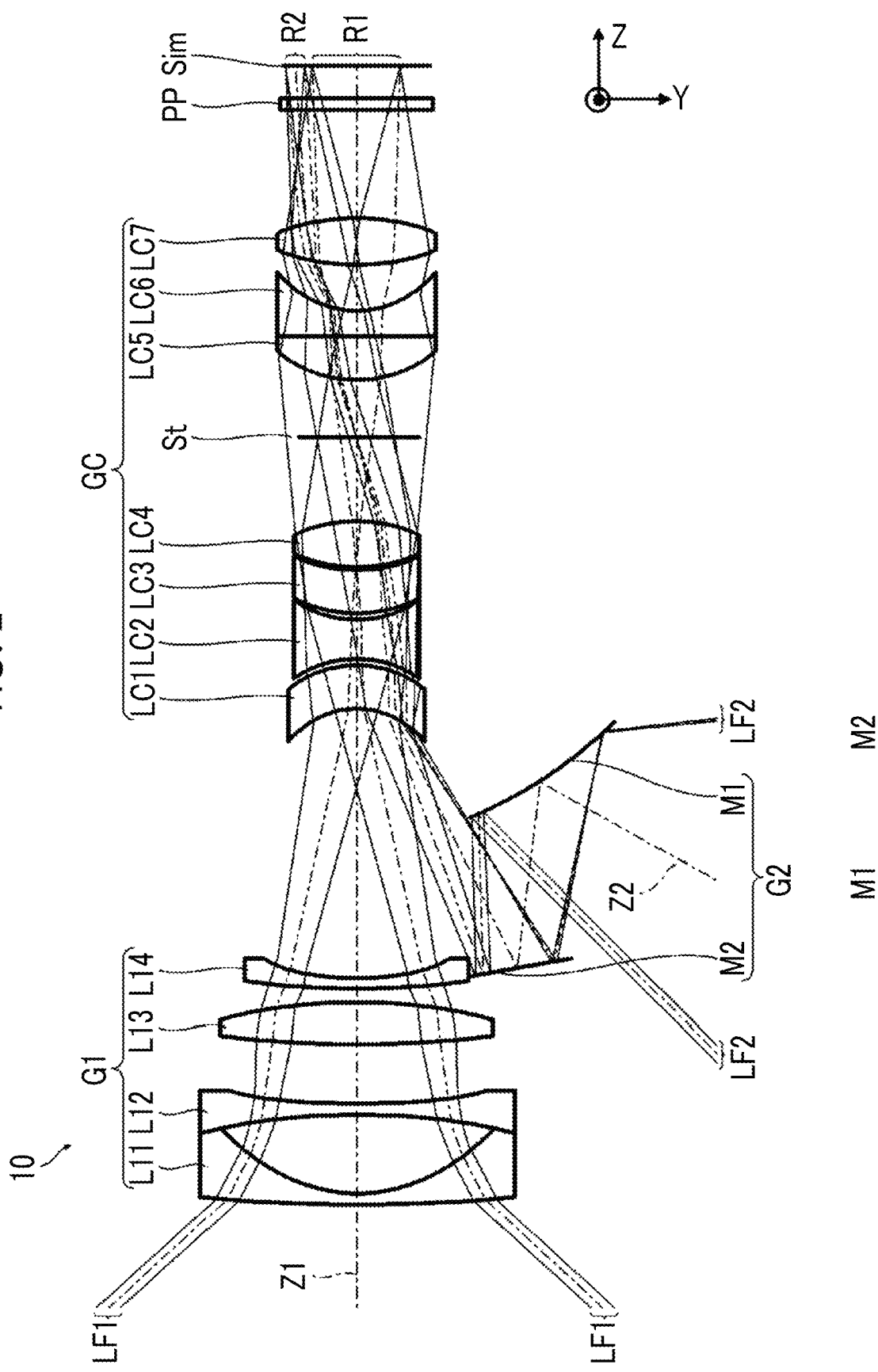
FIG. 2 is a cross-sectional view showing an embodiment of an imaging lens.

FIG. 2 is a cross-sectional view showing an embodiment of the imaging lens to which the present invention is applied. In FIG. 2, the left side is the object side, and the right side is the image side. The axis orthogonal to the image plane Sim is the Z axis, the axis orthogonal to the Z axis is the X axis, and the axis orthogonal to the Z axis and the X axis is the Y axis. The X axis is an axis orthogonal to the paper surface in FIG. 2. The Z axis and the Y axis are axes parallel to the paper surface in FIG. 2.

The imaging lens 10 shown in FIG. 2 is a lens that forms subject images of the first plane S1 and the second plane S2 having different angles on a first light receiving region R1 and a second light receiving region R2, which are different, in one image sensor. The imaging lens 10 comprises a first optical system G1 that images the first plane, a second optical system G2 that images the second plane, a common optical system GC that forms a subject image, which is incident through the first optical system G1, on the first light receiving region of the image sensor and forms a subject image, which is incident through the second optical system G2, on the second light receiving region of the image sensor, and an aperture stop St.

In addition, in a case of applying the imaging lens 10 to an imaging apparatus, it is preferable to comprise various filters according to the specifications of the imaging apparatus, a protective cover glass, and the like. For this reason, an example of the imaging lens 10 of FIG. 2 is shown, in which a parallel plane plate-like optical element PP assumed as an example thereof is disposed between a lens system and an image plane Sim (light receiving surface of the image sensor). It should be noted that the position where the optical element PP is disposed is not limited to this. Further, the imaging lens 10 may be configured such that the optical element PP is omitted.

The first optical system G1 is disposed on the object side with respect to the common optical system GC, and is disposed on the same axis. The first optical system G1 comprises a negative lens L11, a negative lens L12, a positive lens L13, and a negative lens L14, in order from the object side along an optical axis Z1 perpendicular to the image plane Sim. Each of the lenses L11 to L14 is an example of an optical element.

The second optical system G2 is disposed on the object side with respect to the common optical system GC. The second optical system G2 comprises a first mirror M1 having a convex surface and a second mirror M2 having a convex surface, in order from the object side along an optical axis Z2 parallel to the ZY plane. The first mirror M1 and the second mirror M2 are examples of reflective optical elements having powers. For convenience, FIG. 1 shows only the reflective surfaces of the first mirror M1 and the second mirror M2.

The common optical system GC comprises a negative lens LC1, a negative lens LC2, a positive lens LC3, a positive lens LC4, a cemented lens in which a positive lens LC5 and a negative lens LC6 are cemented, and a positive lens LC7, in order from the object side along the optical axis Z1.

The aperture stop St is disposed between the lens LC4 and the lens LC5 of the common optical system GC.

[Light Path]

Next, a path of light incident into the imaging lens 10 of the present embodiment will be described.

<<Path of Light Incident into First Optical System>>

In FIG. 2, the optical path of the off-axis rays LF1 having the maximum angle of view is shown as the optical path of the light incident into the first optical system G1.

Light originated from the subject on the first plane is incident on the light receiving surface of the image sensor through the first optical system G1 and the common optical system GC, and forms an image of the subject on the first light receiving region R1 of the image sensor.

The light incident into the first optical system G1 passes through lenses in the order of the lens L11, the lens L12, the lens L13, and the lens L14, is emitted from the first optical system G1, and is incident into the common optical system GC. The light incident on the common optical system GC passes from lenses in the order of the lens LC1, the lens LC2, the lens LC3, the lens LC4, the aperture stop St, the lens LC5, the lens LC6, and the lens LC7, is emitted from the common optical system GC, and is incident on the light receiving surface of the image sensor.

<<Path of Light Incident into Second Optical System>>

In FIG. 2, the optical path of the off-axis rays LF2 having the maximum angle of view is shown as the optical path of the light incident into the second optical system G2.

Light originated from the subject on the second plane is incident on the light receiving surface of the image sensor through the second optical system G2 and the common optical system GC, and forms an image of the subject on the second light receiving region R2 of the image sensor.

Here, the light incident into the second optical system G2 is first reflected by the first mirror M1. The light reflected by the first mirror M1 is further reflected by the second mirror M2 and is emitted from the second optical system G2. The light reflected by the second mirror M2 and emitted from the second optical system G2 is incident into the common optical system GC. The light incident on the common optical system GC passes from lenses in the order of the lens LC1, the lens LC2, the lens LC3, the lens LC4, the aperture stop St, the lens LC5, the lens LC6, and the lens LC7, is emitted from the common optical system GC, and is incident on the light receiving surface of the image sensor.

[Angle of View]

Next, the angle of view at which imaging is performed by each optical system will be described.

An angle of view at which imaging is performed by the first optical system G1 and the common optical system GC is a first angle of view, and an angle of view at which imaging is performed by the second optical system G2 and the common optical system GC is a second angle of view. The imaging lens 10 has a first angle of view and a second angle of view which overlap with each other.

As shown in FIG. 1, an angle, which is formed between the end E2 of the second plane S2 on the overlapping side and the optical axis Z1 of the first optical system G1 and the common optical system GC, (so-called half angle of view) is $\omega 12$ and that an angle, which is formed between an end E1 of the first plane S1 on the overlapping side and an axis Ax orthogonal to the optical axis Z1, is $\omega 21$. The imaging lens 10 is configured to satisfy the condition of $\omega 12 + \omega 21 > \pi/2$.

[Focus Adjustment]

The imaging lens 10 comprises a first focus adjustment unit that adjusts the focus of an optical system composed of the first optical system G1 and the common optical system GC, and a second focus adjustment unit that adjusts the focus of an optical system composed of the second optical system G2 and the common optical system GC.

<<First Focus Adjustment Unit>>

FIGS. 3A and 3B show a conceptual diagram of focus adjustment performed by the first focus adjustment unit.

As shown in FIGS. 3A and 3B, the first focus adjustment unit adjusts the focus of the optical system composed of the first optical system G1 and the common optical system GC by moving the entire first optical system G1 back and forth along the optical axis Z1.

In FIGS. 3A and 3B, the direction indicated by the arrow AR1 is the moving direction of the first optical system G1. FIG. 3B shows a state in which the first optical system G1 is moved to the object side relative to FIG. 3A. As a mechanism for moving the first optical system G1, a known moving mechanism such as a cam mechanism or a helicoid mechanism can be employed.

<<Second Focus Adjustment Unit>>

FIGS. 4A and 4B show a conceptual diagram of focus adjustment performed by the second focus adjustment unit.

The second focus adjustment unit adjusts the focus of the optical system composed of the second optical system G2 and the common optical system GC by moving the second mirror M2 back and forth along the optical axis Z1 of the first optical system G1 and the common optical system GC.

In FIGS. 4A and 4B, the direction indicated by the arrow AR2 is the moving direction of the second mirror M2. FIG. 4B shows a state in which the second mirror M2 is moved to the object side relative to FIG. 4A. As a mechanism for moving the second mirror M2, a known moving mechanism that linearly moves the optical element can be employed.

[Effect]

In a case where the imaging lens 10 configured as described above is applied to an imaging apparatus, the subject image of the first plane S1 is formed on the first light receiving region R1 of the image sensor IS through the first optical system G1 and the common optical system GC. Further, the subject image of the second plane S2 is formed on the second light receiving region R2 of the image sensor IS through the second optical system G2 and the common optical system GC. The second light receiving region R2 is a region different from the first light receiving region R1. The first plane S1 and the second plane S2 are discontinuous planes having different angles. Therefore, according to the imaging lens 10 of the present embodiment, in a case where the optical system is applied to an imaging apparatus, one image sensor IS is able to image two discontinuous planes.

Further, in the imaging lens 10 of the present embodiment, the angle of view (first angle of view), at which imaging is performed by the first optical system G1 and the common optical system GC, overlaps with the angle of view (second angle of view) at which imaging is performed by the second optical system G2 and the common optical system GC. Thereby, in a case where the optical system is applied to an imaging apparatus, subject images of discontinuous planes can be captured without a blind spot.

Further, the imaging lens 10 of the present embodiment comprises a first focus adjustment unit and a second focus adjustment unit. The first focus adjustment unit adjusts the focus of the optical system composed of the first optical system G1 and the common optical system GC. Thereby, the subject on the first plane S1 can be sharply imaged. The second focus adjustment unit adjusts the focus of the optical system composed of the second optical system G2 and the common optical system GC. Thereby, the subject on the second plane S2 can be sharply imaged. As described above, by providing the first focus adjustment unit and the second focus adjustment unit, it is possible to sharply image subjects on both the first plane S1 and the second plane S2.

Modification Examples

<<Second Optical System>>

In the above-mentioned embodiment, the second optical system G2 is composed of two mirrors, but the configuration of the second optical system G2 is not limited to this. Any configuration may be used as long as the configuration includes two reflective optical elements and at least one of the reflective optical elements has a power. Accordingly, in the case of the configuration using two mirrors, one of the mirrors may be configured as a plane mirror. Moreover, the reflective optical element which composes the second optical system G2 is not limited to a mirror, and other reflective optical elements may be employed. For example, a lens having a reflective surface may be used. In order to obtain a wide angle, it is preferable that the reflective surface of the reflective optical element is a convex surface.

<<First Focus Adjustment Unit>>

In the above-mentioned embodiment, the focus of the optical system composed of the first optical system G1 and the common optical system GC is adjusted by moving the entire first optical system G1. The configuration of the first focus adjustment is not limited to this. The configuration may be made such that focus adjustment is performed by moving only some of the lenses composing the first optical system G1.

<<Second Focus Adjustment Unit>>

In the above-mentioned embodiment, the focus of the optical system composed of the second optical system G2 and the common optical system GC is adjusted by moving the second mirror M2 along the optical axis Z1 of the first optical system G1 and the common optical system GC. The configuration of the second focus adjustment unit is not limited to this. For example, focus adjustment may be performed by moving the first mirror M1 along the optical axis Z1 of the first optical system G1 and the common optical system GC. Alternatively, two mirrors including the first mirror M1 and the second mirror M2 may be moved relative to each other, thereby adjusting the focus. Further, the configuration may be made such that focus adjustment is performed by combining rotation around an axis parallel to the X axis, movement in a direction parallel to the Y axis, or the like.

<<Adjustment of Imaging Direction of Optical System Composed of Second Optical System and Common Optical System>>

The imaging direction of the optical system composed of the second optical system and the common optical system can be adjusted, for example, by rotating the second mirror M2 of the second optical system G2 around the axis parallel to the X axis. In a case where the first plane S1 and the second plane S2 have different angles, the angle of rotation of the second mirror M2 is adjusted in accordance with the angle of the second plane S2 with respect to the first plane S1, and is adjusted to the angle of the second plane S2.

In addition, an angle adjustment unit that adjusts the angle of rotation of the second mirror M2 may be provided such that the imaging direction can be adjusted in an optional direction.

<<First Plane and Second Plane>>

As described above, the imaging lens is configured as a lens that forms subject images of two discontinuous planes on different light receiving regions of one image sensor. Particularly, it is appropriate that the angle formed by the two planes is less than $\pi$. Further, in a case where the angle formed by the two planes is $\pi/2$, the imaging lens can be configured as an imaging lens capable of simultaneously imaging two perpendicular planes.

<<Imaging Three or More Planes>>

By providing a plurality of second optical systems, three or more discontinuous planes can be imaged. In such a case, each second optical system is disposed at a rotationally symmetric position which is rotationally symmetric about the optical axis of the first optical system and the common optical system.

Figure 5:
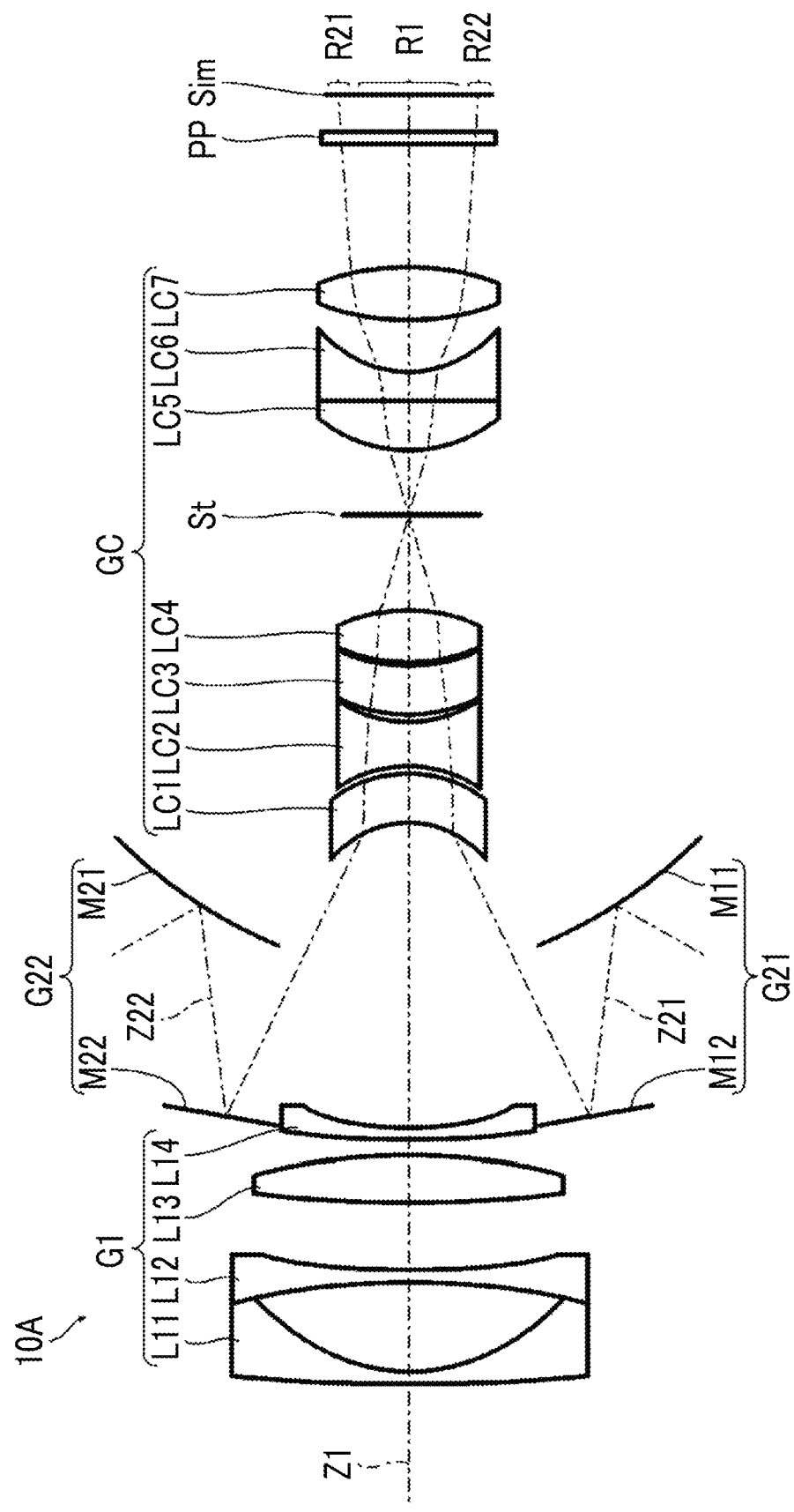
FIG. 5 is a cross-sectional view showing an example of an imaging lens that images three planes having different angles.

FIG. 5 is a cross-sectional view showing an example of an imaging lens that images three planes having different angles. In FIG. 5, the left side is the object side, and the right side is the image side.

The imaging lens 10A shown in FIG. 5 is configured as a lens that forms subject images of the first plane, the second-1 plane, and the second-2 plane, which are three discontinuous planes, on different light receiving regions of one image sensor. The first plane is disposed between the second-1 plane and the second-2 plane, and the planes have different angles.

As shown in FIG. 5, the imaging lens 10A of the present example comprises two second optical systems G21 and G22 as compared with the imaging lens 10 of the above-mentioned embodiment. One is a second-1 optical system G21 and the other is a second-2 optical system G22.

The second-1 optical system G21 is an optical system that images the second-1 plane. The second-1 optical system G21 comprises a first mirror M11 having a convex surface and a second mirror M12 having a convex surface in order from the object side along the optical axis Z21.

The second-2 optical system G22 is an optical system that images the second-2 plane. The second-2 optical system G22 comprises a first mirror M21 having a convex surface and a second mirror M22 having a convex surface in order from the object side along the optical axis Z22.

The second-1 optical system G21 and the second-2 optical system G22 are arranged at positions which are rotationally symmetric by 180° about the optical axis Z1 of the first optical system G1 and the common optical system GC as the rotationally symmetric center. In such a case, the second-1 optical system G21 and the second-2 optical system G22 are arranged to be axisymmetric about the optical axis Z1 of the first optical system G1 and the common optical system GC.

According to the imaging lens 10A of the present example, the subject image of the first plane is formed on the first light receiving region R1 of the image sensor by the first optical system G1 and the common optical system GC. The subject image of the second-1 plane is formed on the first second light receiving region R21 of the image sensor by the second-1 optical system G21 and the common optical system GC. The subject image of the second-2 plane is formed on the second-2 light receiving region R22 of the image sensor by the second-2 optical system G22 and the common optical system GC.

As described above, by providing two second optical systems, three discontinuous planes can be imaged. In addition, the plurality of discontinuous planes can be imaged by arranging the second optical systems at the plurality of positions which are rotationally symmetric about the optical axis Z1 of the first optical system and the common optical system as the rotationally symmetric center.

Other Modification Examples

The above-mentioned preferred configurations and possible configurations can be optionally combined and are preferably selectively adopted as appropriate in accordance with matters required for the imaging lens. By appropriately adopting the above configuration, it is possible to realize an optical system compatible with favorable optical performance and higher specifications.

Examples

Numerical examples of the imaging lens 10 of the above-mentioned embodiment will be described below.

FIGS. 6A to 6C are tables showing lens data of the imaging lens of the above-mentioned embodiment. FIG. 6A is a table showing lens data of the first optical system G1. FIG. 6B is a table showing lens data of the second optical system G2. FIG. 6C is a table showing lens data of the common optical system GC.

In each table shown in FIGS. 6A to 6C, each numerical value in the column of "surface number" is a number of an i-th surface (i=1, 2, 3, ... ), where surfaces of constituent elements are numbered such that i sequentially increases toward the image plane in a case where an object side surface of a constituent element closest to the object side is regarded as a first surface. Each numerical value in the column of "radius of curvature" is a radius of curvature of the i-th surface. Each numerical value in the column of "surface distance" is a distance on the optical axis between the i-th surface and the (i+1)th surface. Each numerical value in the column of "Nd" is a refractive index at the d line (a wavelength of 587.6 nm) of the constituent elements of the j-th surface (j=1, 2, 3, ... ) in a case where the constituent elements are numbered such that j sequentially increases toward the image plane in a case where the constituent element closest to the object side is regarded as a first element. Each numerical value in the column of "vd" is an Abbe number based on the d line of the j-th constituent element. Each numerical value in the column of "Y axis direction shift" is a shift amount in a case where the constituent element is shifted along the Y axis. The "angle of rotation around the X axis" is an angle of rotation in a case where the constituent element is rotated around the X axis.

The lens data of the common optical system GC also additionally indicates the aperture stop St and the optical element PP, and the text "St" is also written in the place of the surface number of the surface corresponding to the aperture stop St.

The direction of the optical axis Z1 of the first optical system G1 and the common optical system GC is set as the Z axis, the direction orthogonal to the Z axis is set as the X axis, and the direction orthogonal to the Z axis and the X axis is set as the Y axis. The X axis is an axis orthogonal to the paper surface. The Y axis is an axis parallel to the paper surface. The Z axis is positive in the direction from the object toward the image. The X axis is positive in the direction from the back to the front with respect to the paper surface. The Y axis is positive in the direction from the bottom to the top of the paper surface. Therefore, regarding the radius of curvature, the sign is positive in a case where the surface shape of the constituent element is convex toward the object side, and the sign is negative in a case where the surface shape is convex toward the image side.

Regarding the surface distance, the sign is positive in a case where the (i+1)th surface is located on the image side relative to the i-th surface, and the sign is negative in a case where the surface distance is located on the object side.

Each numerical value in each table is noted as a numerical value rounded off to a predetermined decimal place. The unit of angle uses "degree", and the unit of length uses "mm". However, since the optical system can be used to be expanded in proportion or be reduced in proportion, other appropriate units can also be used.

It should be noted that the numerical value in the bottom place of "surface distance" of the lens data of the first optical system G1 indicates a surface distance between the final surface of the first optical system G1 and the first surface of the common optical system GC. The numerical value in the bottom place of "surface distance" of the lens data of the second optical system G2 indicates a surface distance between the final surface of the second optical system G2 and the first surface of the common optical system GC. The numerical value in the bottom place of "surface distance" of the lens data of the common optical system GC indicates a surface distance between the final surface of the common optical system GC and the image plane Sim.

The imaging lens 10 of the present example comprises, as the first optical system G1, a negative lens L11, a negative lens L12, a positive lens L13, and a negative lens L14 in order from the object side. As the second optical system G2, a first mirror M1 having a convex surface and a second mirror M2 having a convex surface are provided in order from the object side. Further, as the common optical system GC, a negative lens LC1, a negative lens LC2, a positive lens LC3, a positive lens LC4, a cemented lens in which a positive lens LC5 and a negative lens LC6 are cemented, and a positive lens LC7 are provided in order from the object side. An aperture stop St is provided between the lenses LC4 and LC5.

Further, the imaging lens 10 of the present example adjusts the focus of the optical system composed of the first optical system G1 and the common optical system GC by moving the entire first optical system G1 along the optical axis Z1. In addition, the second mirror M2 of the second optical system G2 is moved along the optical axis Z1 so as to adjust the focus of the optical system composed of the second optical system G2 and the common optical system GC.

◆Projection Lens◆

The imaging lens of the above-mentioned embodiment functions as a projection lens by disposing an image display element at the position of the image sensor. The imaging lens of the above-mentioned embodiment has no problem even in a case where used as a projection lens, and is able to project an image onto each of two discontinuous planes.

In a case where the imaging lens is used as a projection lens, the imaging lens functions as an optical system that enlarges projection images displayed in first and second display regions, which are different, in one image display element so as to project the images onto the first plane S1 and the second plane S2. In such a case, the first optical system G1 functions as an optical system that performs projection onto the first plane S1, and the second optical system G2 functions as an optical system that performs projection onto the second plane S2. Further, the common optical system GC functions as an optical system that causes the projection image displayed in the first display region of the image display element to be incident into the first optical system G1, and that causes the projection image displayed in the second display region of the image display element to be incident into the second optical system G2.

The angle of view, at which projection onto the first plane is performed through the first optical system G1 and the common optical system GC, is a first angle of view, and the angle of view, at which projection onto the second plane is performed through the second optical system G2 and the common optical system GC, is a second angle of view. Then, the first angle of view overlaps with the second angle of view. Thereby, images can be projected onto two discontinuous planes without a gap.

◆Imaging Apparatus◆

Next, an imaging apparatus using the imaging lens 10 of the above-mentioned embodiment will be described. Here, a case where the invention is applied to the imaging apparatus which images two orthogonal planes (the first plane S1 and the second plane S2) will be described as an example.

[Configuration]

FIG. 7 is a diagram showing a schematic configuration of the imaging apparatus according to the present embodiment.

The imaging apparatus 100 mainly comprises an imaging lens 10, an image sensor IS, an image signal processing unit 110 that processes a signal output from the image sensor IS, and a display unit 120.

<Imaging Lens>

The imaging lens 10 is configured as a lens that images two orthogonal planes (first plane S1 and second plane S2).

<Image Sensor>

The image sensor IS is disposed on the optical axis Z1 of the common optical system GC and is disposed orthogonal to the optical axis Z1 of the common optical system GC. The image sensor IS is composed of a known area image sensor such as a charged coupled device (CCD) or a complementary metal oxide semiconductor (CMOS).

<Image Signal Processing Unit>

Figure 8:
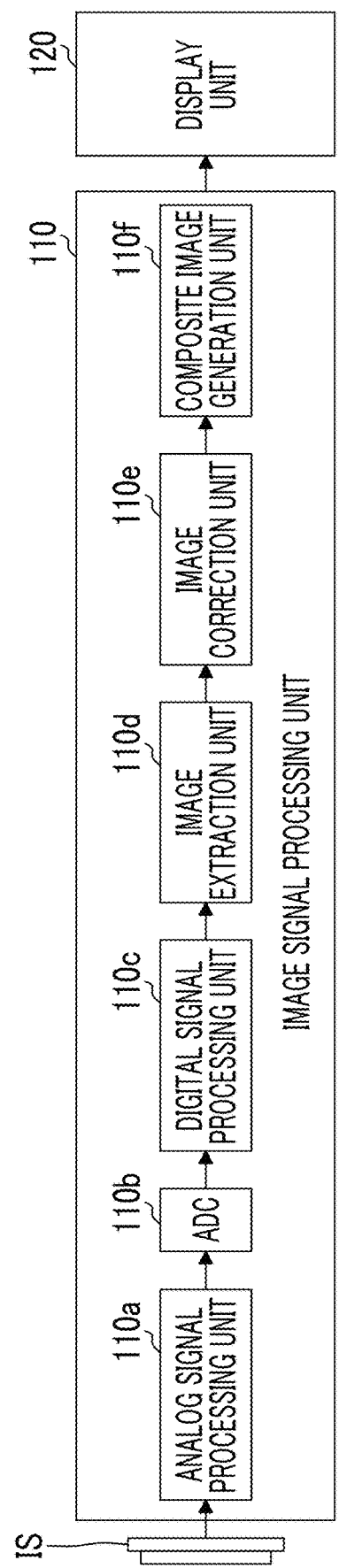
FIG. 8 is a block diagram of an image signal processing unit.

FIG. 8 is a block diagram of the image signal processing unit.

The image signal processing unit 110 comprises an analog signal processing unit 110a, an analog-to-digital converter (ADC) 110b, a digital signal processing unit 110c, an image extraction unit 110d, an image correction unit 110e, a composite image generation unit 110f, and the like.

<Analog Signal Processing Unit>

The analog signal processing unit 110a takes an analog image signal of each pixel which is output from the image sensor IS, and performs predetermined signal processing such as correlated double sampling processing and amplification processing thereon.

<Analog-to-Digital Converter>

The analog-to-digital converter (ADC) 110b converts the analog image signals, which are output from the analog signal processing unit 110a, into digital image signals.

<Digital Signal Processing Unit>

The digital signal processing unit 110c takes a digital image signal which is output from the analog-to-digital converter 110b, and performs predetermined signal processing such as gradation conversion processing, white balance correction processing, gamma correction processing, synchronization processing, and YC conversion processing, thereby generating image data indicating the captured image.

Figure 9:
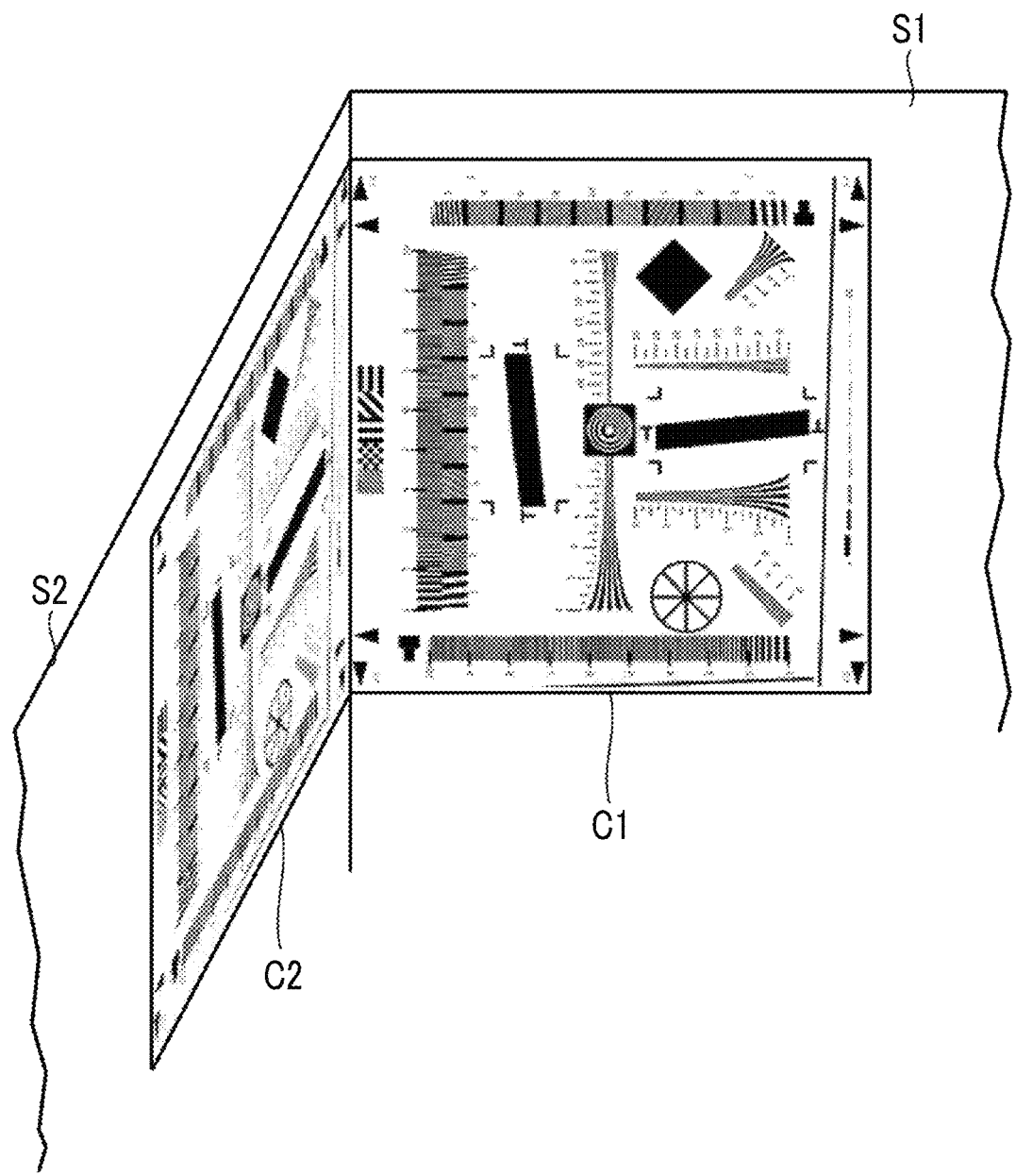
FIG. 9 is a diagram showing an example of a subject.
Figure 10:
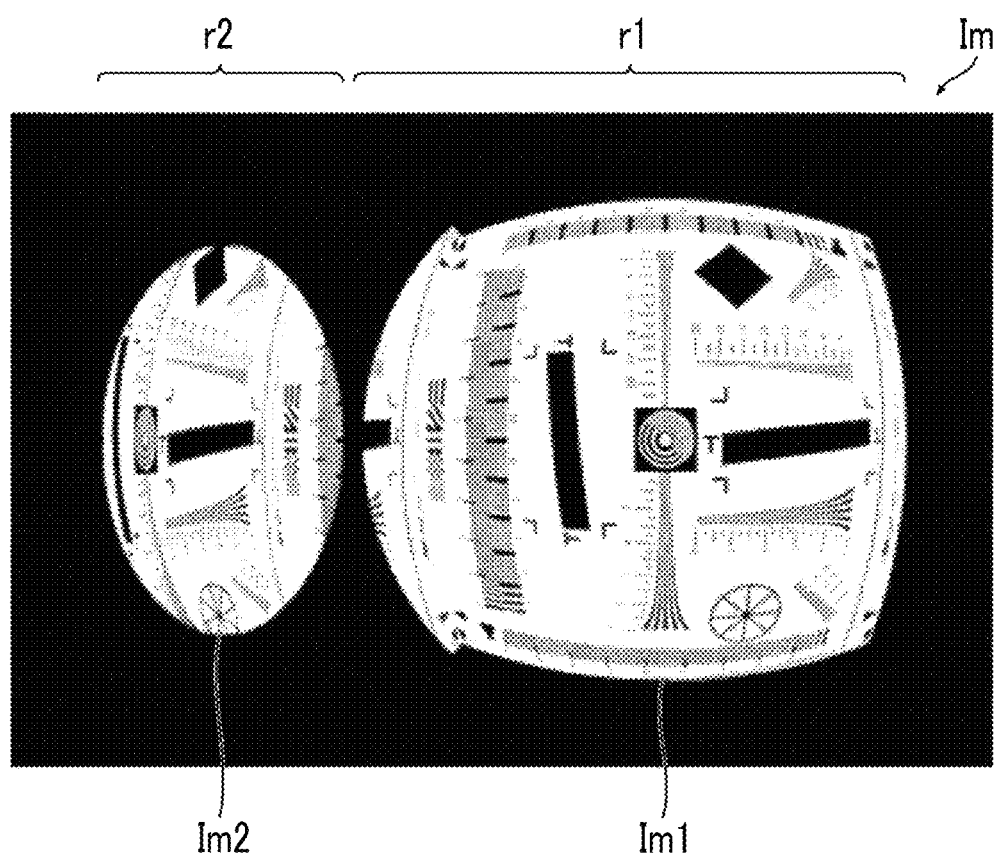
FIG. 10 is a diagram showing an example of an image obtained in a case where the subject shown in FIG. 9 is imaged.

FIG. 9 is a diagram showing an example of a subject. FIG. 10 is a diagram showing an example of an image obtained in a case where the subject shown in FIG. 9 is imaged.

As shown in FIG. 9, the subjects are test charts C1 and C2 attached to the first plane S1 and the second plane S2 that are orthogonal to each other.

As shown in FIG. 10, one image is obtained through imaging. An image obtained through imaging is set as a captured image Im. The captured image Im includes two images Im1 and Im2, which are displayed in different regions r1 and r2, respectively. One region r1 is set as a first region r1, and the other region r2 is set as a second region r2. The first region r1 is a region corresponding to the first light receiving region R1 of the image sensor IS. The second region r2 is a region corresponding to the second light receiving region R2 of the image sensor IS.

The image Im1 displayed in the first region r1 is set as a first image Im1. The first image Im1 is an image captured by an optical system composed of the first optical system G1 and the common optical system GC. The first image Im1 includes a part of the second plane S2 in addition to the image of the first plane S1. That is, the first image Im1 is an image obtained by imaging the first plane S1, and is configured as an image of which a part includes a part of the image of the second plane S2.

The image Im2 displayed in the second region r2 is set as a second image Im2. The second image Im2 is an image captured by an optical system composed of the second optical system G2 and the common optical system GC. The second image Im2 includes a part of the first plane S1 in addition to the image of the second plane S2. That is, the second image Im2 is an image obtained by imaging the second plane S2, and is configured as an image of which a part includes a part of the image of the first plane S1.

As described above, the first image Im1 and the second image Im2 each are configured as an image including a part of the other image. In other words, the images are configured as images including overlapping portions.

<Image Extraction Unit>

The image extraction unit 110d performs processing of extracting the first image Im1 and the second image Im2 from the captured image Im.

Figure 11A:
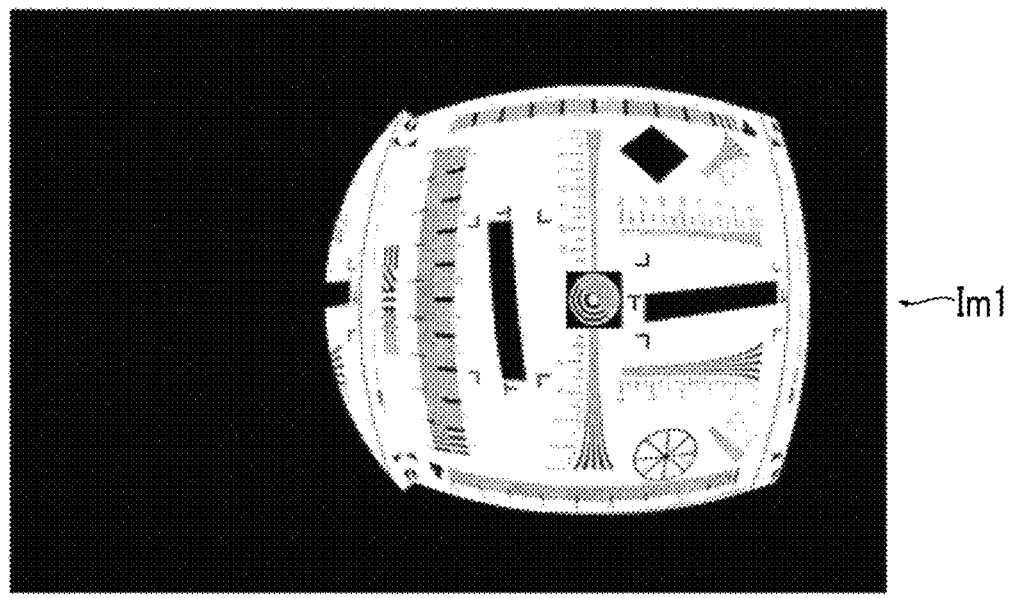
FIGS. 11A and 11B are diagrams each showing an example of an image extracted from a captured image.
Figure 11B:
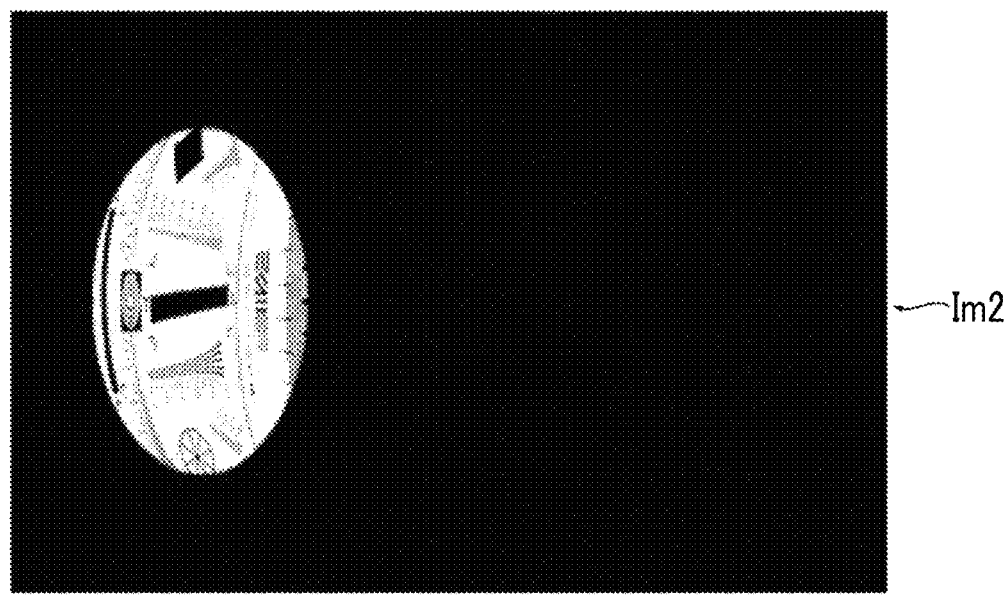

FIGS. 11A and 11B are diagrams each showing an example of an image extracted from a captured image. FIG. 11A shows an example of the first image Im1 extracted from the captured image Im. FIG. 11B shows an example of the second image Im2 extracted from the captured image Im.

As shown in FIGS. 11A and 11B, the first image Im1 and the second image Im2 can be individually acquired from the captured image Im by the extraction processing. The image extraction unit 110d is an example of a captured image acquisition unit.

<Image Correction Unit>

As shown in FIGS. 10, 11A, and 11B, the first image Im1 and the second image Im2 obtained through imaging are distorted. The image correction unit 110e performs necessary correction processing on the first image Im1 and the second image Im2 obtained through imaging. The correction is, for example, distortion correction or the like. Further, in order to adjust the sizes of the first image Im1 and the second image Im2, processing for enlarging and reducing the image is performed as necessary. The correction processing can be performed using a known method.

Figure 12A:
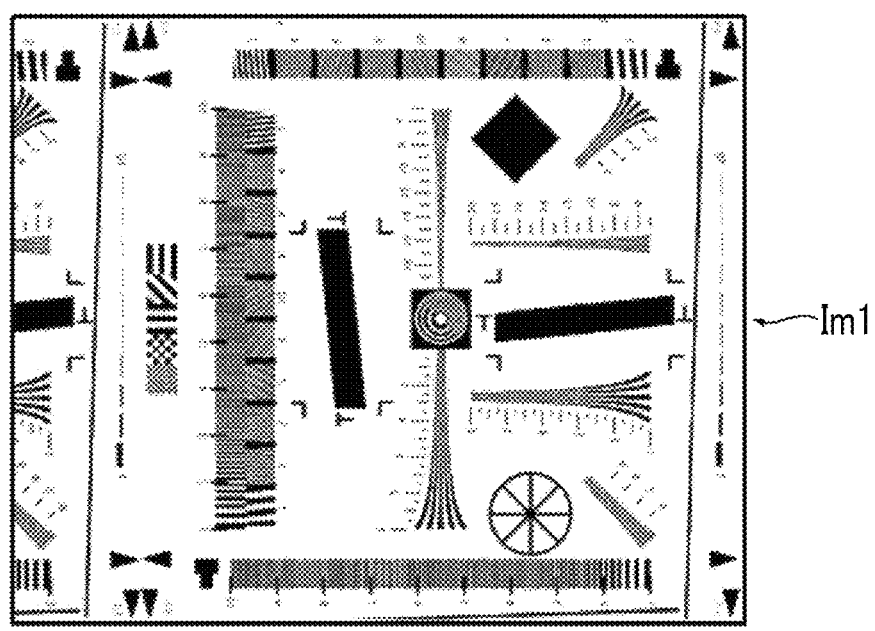
FIGS. 12A and 12B are diagrams each showing an example of an image after correction processing.
Figure 12B:
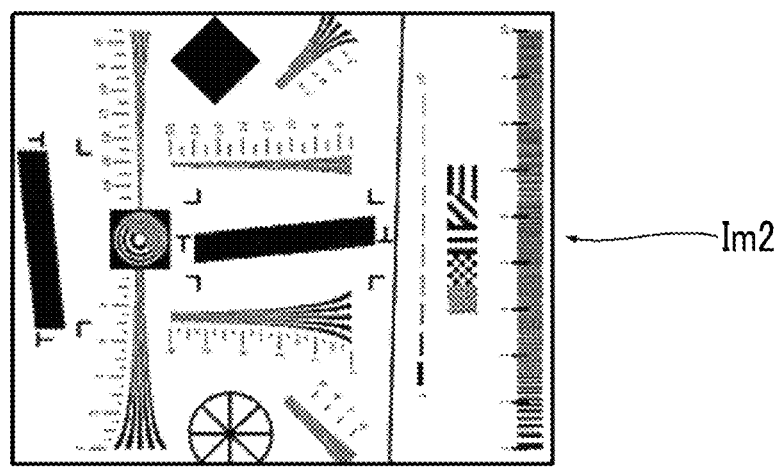

FIGS. 12A and 12B are diagrams each showing an example of an image after correction processing. FIG. 12A shows an example of the corrected first image Im1. FIG. 12B shows an example of the corrected second image Im2.

As shown in FIGS. 12A and 12B, an image without distortion can be obtained by performing necessary correction processing.

<Composite Image Generation Unit>

The composite image generation unit 110f acquires the first image Im1 and the second image Im2 which are corrected, and generates a single composite image obtained by combining the first image Im1 and the second image Im2.

As described above, the first image Im1 and the second image Im2 have portions that overlap with each other.

Figure 13A:
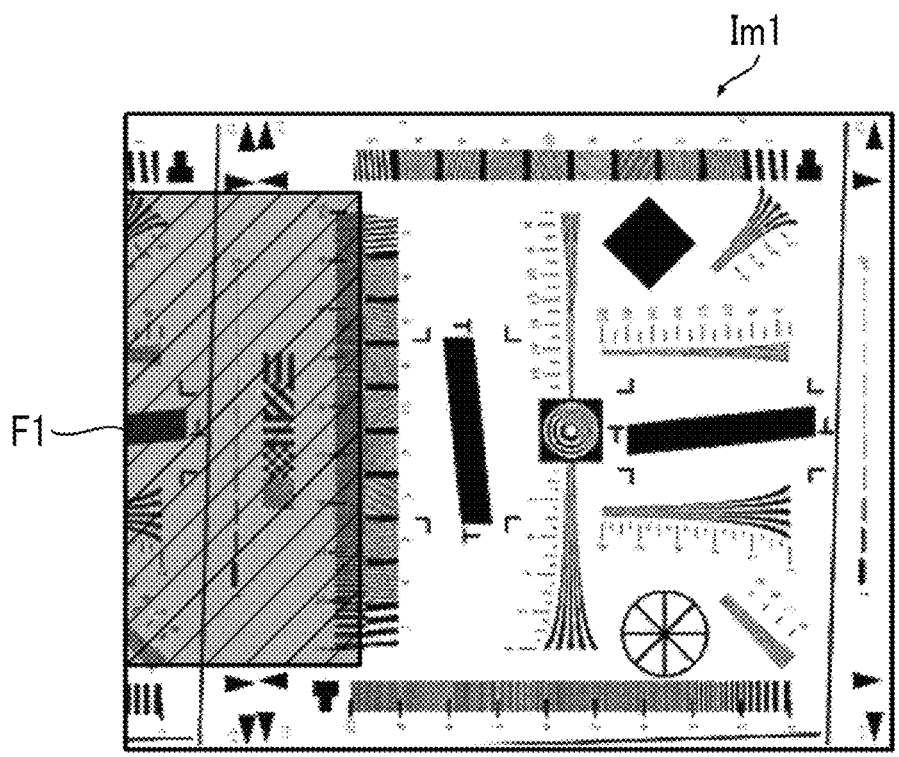
FIGS. 13A and 13B are diagrams showing overlapping portions of the first image and the second image.
Figure 13B:
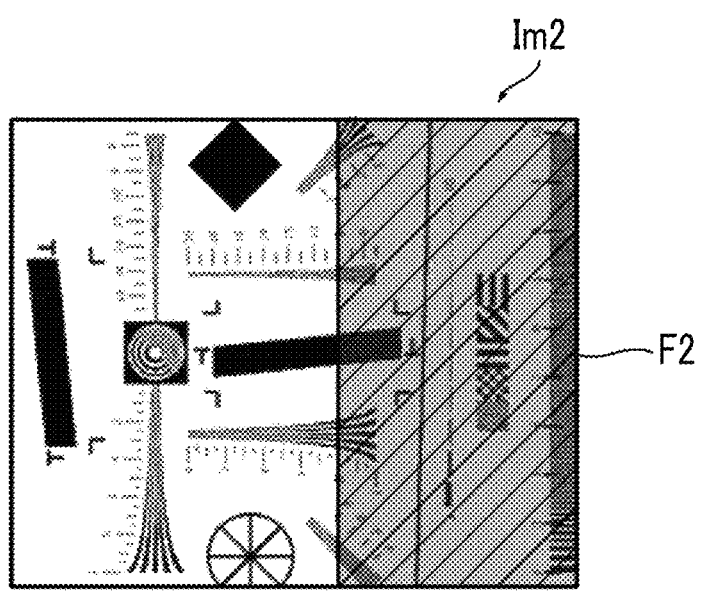

FIGS. 13A and 13B are diagrams showing overlapping portions between the first image and the second image.

FIG. 13A shows an overlapping portion of the first image Im1. In the drawing, a hatched region surrounded by a frame F1 is a portion overlapping with the second image Im2.

FIG. 13B shows an overlapping portion of the second image Im2. In the drawing, a hatched region surrounded by a frame F2 is a portion overlapping with the first image Im1.

The composite image generation unit 110f generates one composite image by combining the first image Im1 and the second image Im2 using the overlapping portion. Specifically, first, the overlapping portion is extracted from each of the first image Im1 and the second image Im2. Next, one composite image, which is obtained by combining the first image Im1 and the second image Im2, is generated by registering the first image Im1 and the second image Im2 using the extracted overlapping portion.

Figure 14:
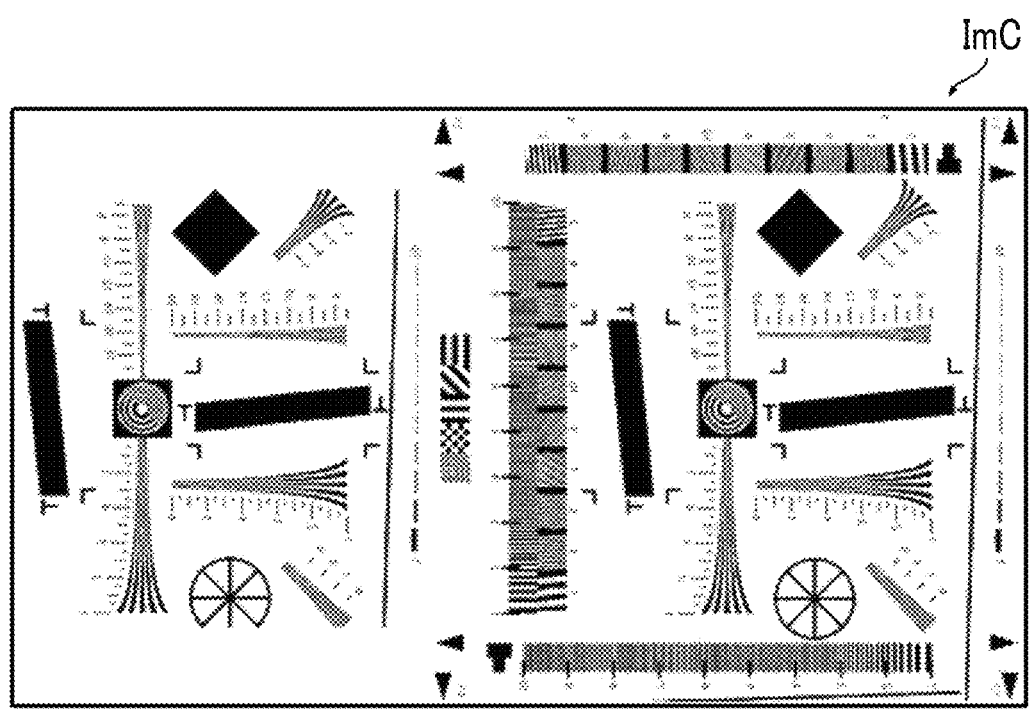
FIG. 14 is a diagram showing an example of a composite image.

FIG. 14 is a diagram showing an example of a composite image.

As shown in the drawing, one composite image ImC is generated by combining the first image Im1 and the second image Im2. The composite image ImC is an image obtained by combining the first image Im1 and the second image Im2, and is an image obtained by developing the images of the first plane S1 and the second plane S2 that are orthogonal to each other on a plane.

<<Display Unit>>

The display unit 120 includes a display device such as a liquid crystal display (LCD) and a driving circuit thereof, and displays the composite image generated by the image signal processing unit 110.

[Effect]

Next, the effect of the imaging apparatus 100 according to the present embodiment will be described.

By using the imaging lens 10 of the above-mentioned embodiment, the subject images of the first plane S1 and the second plane S2 that are orthogonal to each other can be formed on different light receiving regions of one image sensor. Thereby, two discontinuous planes can be imaged by one image sensor.

In the captured image Im, as shown in FIG. 10, two images Im1 and Im2 are displayed in two regions r1 and r2. The first image Im1 displayed in the first region r1 is an image obtained by imaging the first plane S1, and a part thereof includes an image of the second plane S2. The second image Im2 displayed in the other region, the second region r2, is an image obtained by imaging the second plane S2, and a part thereof includes an image of the first plane S1.

The captured image Im is divided into a first image Im1 and a second image Im2, as shown in FIGS. 11A and 11B. Each of the divided images Im1 and Im2 is subjected to necessary correction processing as shown in FIGS. 12A and 12B. Thereafter, as shown in FIGS. 13A, 13B, and 14, one image ImC is combined with the use of the overlapping portions, and the combined image ImC is displayed on the display unit 120.

As described above, according to the imaging apparatus 100 of the present embodiment, one imaging apparatus 100 is able to image two discontinuous planes without a gap.

Modification Examples

In the above-mentioned embodiment, the generated composite image ImC is displayed on the display unit 120, but the generated composite image ImC may be recorded on a recording unit.

Further, in a case of recording on the recording unit, the composite image ImC may not be recorded but the captured image Im, the first image Im1 and the second image Im2 extracted from the captured image Im, and the like may be recorded.

Further, although the case where the imaging lens comprising one second optical system is used has been described as an example in the above-mentioned embodiment, an imaging lens comprising a plurality of second optical systems may be used. In such a case, in the captured image, a plurality of second images are displayed at a plurality of positions which are rotationally symmetric about the center of the first image as the rotationally symmetric center.

Further, the image sensor IS may shift the position of the center of the light receiving surface in a direction perpendicular to the optical axis Z1 of the common optical system GC as necessary. Thereby, the light receiving surface can be used effectively.

◆Projection Apparatus◆

As described above, the imaging lens 10 functions as a projection lens by disposing the image display element at the position of the image sensor. Hereinafter, a projection apparatus using the imaging lens 10 as a projection lens will be described. Here, a case where the present invention is applied to a projection apparatus that projects an image onto two orthogonal planes (first plane S1 and second plane S2) will be described as an example.

[Configuration]

Figure 15:
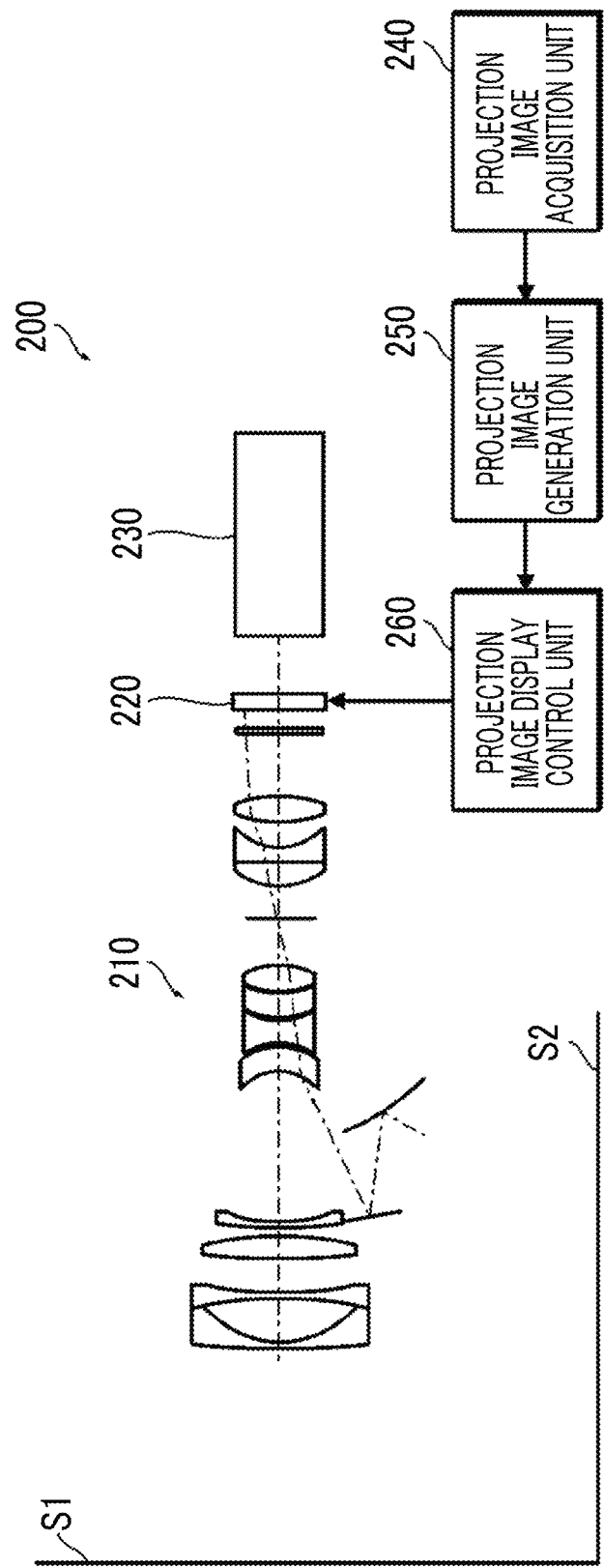
FIG. 15 is a diagram showing a schematic configuration of a projection apparatus.

FIG. 15 is a diagram showing a schematic configuration of the projection apparatus of the present embodiment.

The projection apparatus 200 mainly comprises a projection lens 210, an image display element 220, an illumination optical system 230, a projection image acquisition unit 240, a projection image generation unit 250, and a projection image display control unit 260.

<Projection Lens>

The projection lens 210 is configured as a lens that projects, in an enlarged manner, an image obtained from the image display element 220 onto two orthogonal planes (first plane S1 and second plane S2). More specifically, the projection lens 210 is configured as a lens that projects, in an enlarged manner, the projection image, which is displayed in the first display region of the image display element 220, onto the first plane S1 and projects, in an enlarged manner, the projection image, which is displayed in the second display region of the image display element 220, onto the second plane S2. The basic configuration is the same as that of the imaging lens 10 of the above-mentioned embodiment.

<Image Display Element>

The image display element 220 is a transmissive display element that forms image light, and forms an image by modulating the illumination light from the illumination optical system 230 in response to an image signal. The image display element 220 is disposed at a position corresponding to the imaging position of the projection lens 210.

<Illumination Optical System>

The illumination optical system 230 comprises a light source, a uniformizing optical system, and the like. As the light source of the illumination optical system 230, for example, a light emitting diode (LED), a mercury lamp, a laser, or the like can be used.

<Projection Image Acquisition Unit>

The projection image acquisition unit 240 acquires images to be projected onto the first plane S1 and the second plane S2. The acquired images are one image (refer to FIG. 14).

<Projection Image Generation Unit>

The projection image generation unit 250 generates a projection image from the image acquired by the projection image acquisition unit 240. That is, an image to be projected onto the first plane S1 and the second plane S2 is generated. At this time, the projection image generation unit 250 generates a continuous image at the boundary between the first plane S1 and the second plane S2 in a case where projection onto the first plane S1 and the second plane S2 is performed through the projection lens 210.

Figure 16:
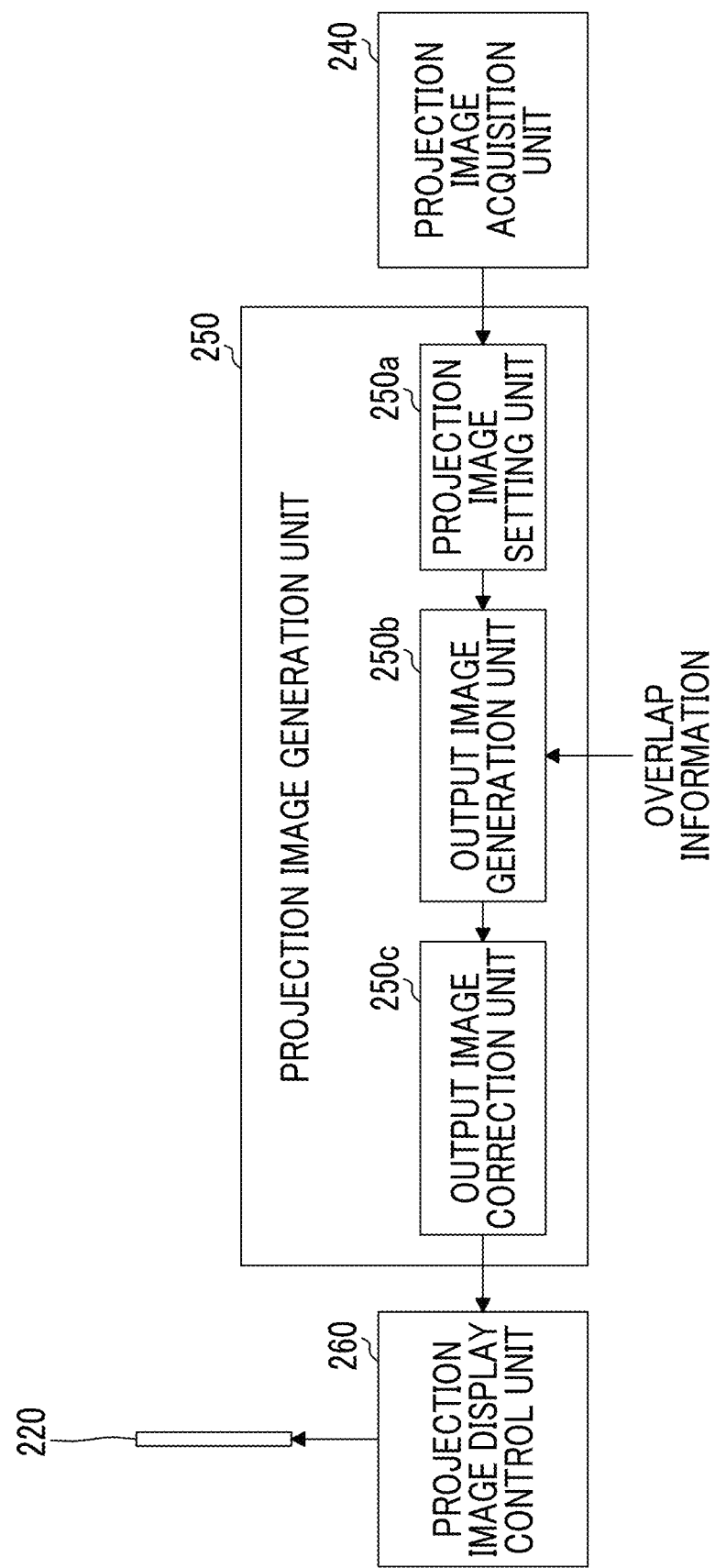
FIG. 16 is a block diagram of functions provided in a projection image generation unit.

FIG. 16 is a block diagram of functions provided in the projection image generation unit.

The projection image generation unit 250 functions as a projection image setting unit 250a, an output image generation unit 250b, and an output image correction unit 250c.

The projection image setting unit 250a sets the image to be projected onto the first plane S1 and the second plane S2 from the image acquired by the projection image acquisition unit 240.

Figure 17:
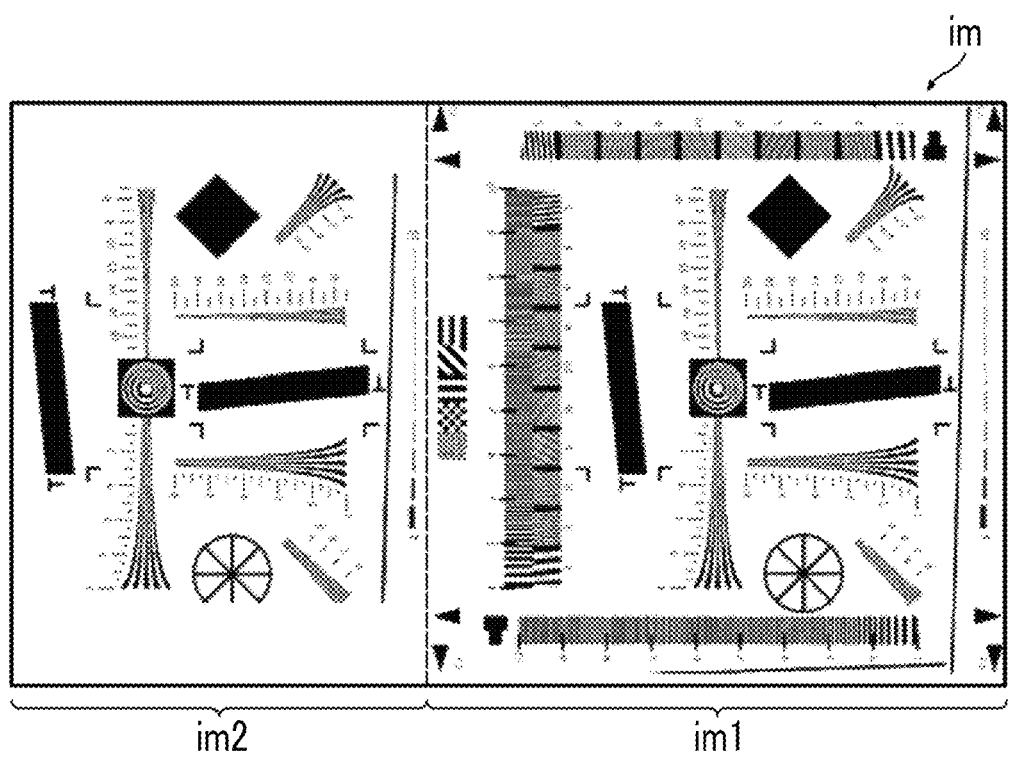
FIG. 17 is a diagram showing an example of setting of a projection image.

FIG. 17 is a diagram showing an example of setting of a projection image.

The image acquired by the projection image acquisition unit 240 is set as an input image im. Further, an image projected onto the first plane S1 is set as a first plane projection image im1, and an image projected onto the second plane S2 is set as a second plane projection image im2. The projection image setting unit 250a sets the first plane projection image im1 and the second plane projection image im2 from the input image im.

As described above, the projection image acquisition unit 240 acquires one image as the input image im. The projection image setting unit 250a divides the input image im at a predetermined ratio, and sets the first plane projection image im1 and the second plane projection image im2.

The output image generation unit 250b generates an image (output image) to be displayed on the image display element 220. In a case where the output image is displayed on the image display element 220, the first plane projection image im1 is displayed in the first display region, and the second plane projection image im2 is displayed in the second display region.

As described above, the images projected onto the first plane S1 and the second plane S2 through the projection lens 210 overlap. The output image generation unit 250b generates an output image such that the images projected onto the respective planes do not overlap with each other. Further, the output image generation unit 250b generates an output image such that the images projected onto the respective planes are continuous at the boundary.

Figure 18:
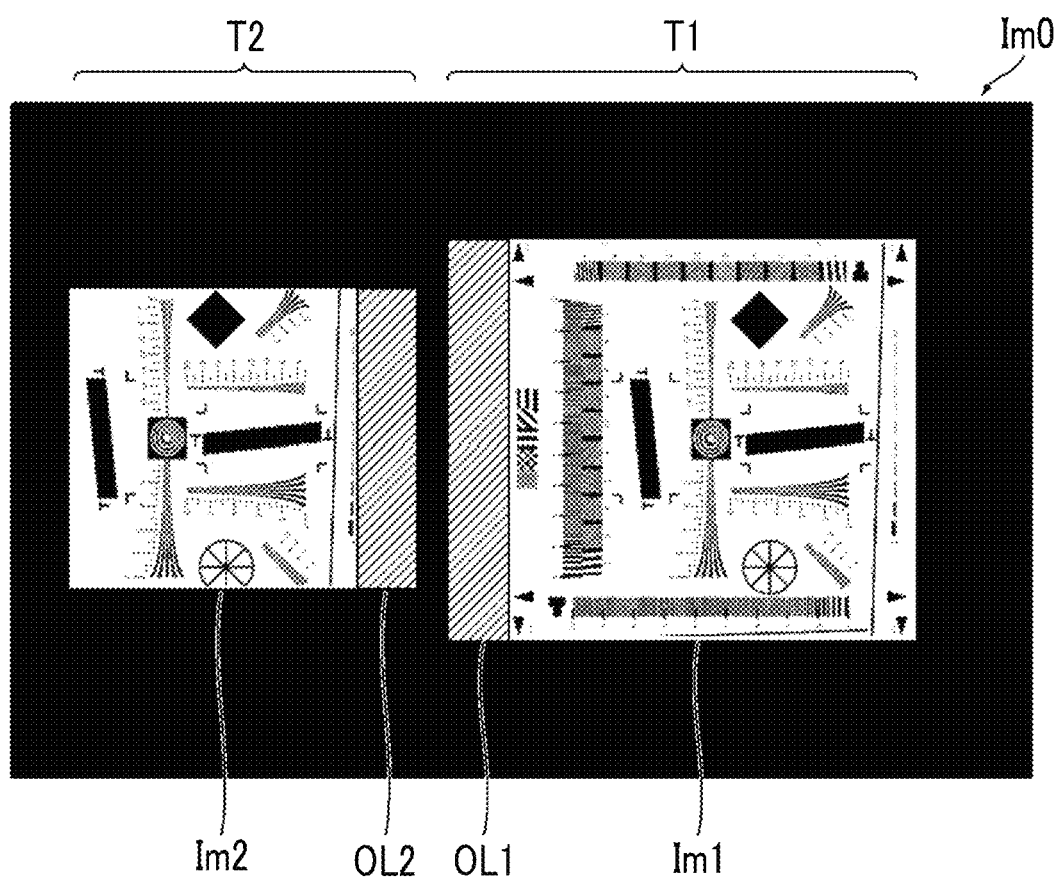
FIG. 18 is a diagram showing an example of an output image.

FIG. 18 is a diagram showing an example of an output image.

In the drawing, a region indicated by the reference numeral T1 is a region displayed in the first display region of the image display element 220 in a case where the output image im0 is displayed on the image display element 220. Further, a region indicated by the reference numeral T2 is a region displayed in the second display region of the image display element 220 in a case where the output image im0 is displayed on the image display element 220.

Further, a region indicated by the reference numeral OL1 is a region projected onto the second plane S2 in a case where an image displayed in the first display region of the image display element 220 is projected. A region indicated by the reference numeral OL2 is a region projected onto the first plane S1 in a case where an image displayed in the second display region of the image display element 220 is projected. That is, the region is a region that overlaps between the image displayed in the first display region and the image displayed in the second display region.

The output image generation unit 250b lays the first plane projection image im1 and the second plane projection image im2 out while avoiding the overlapping region, and generates an output image im0. On the other hand, the output image generation unit 250b generates the output image im0 such that the first plane projection image im1 projected onto the first plane S1 and the second plane projection image im2 projected onto the second plane S2 are continuous at the boundary between the first plane S1 and the second plane S2.

The overlapping region varies depending on the angle of view at which each optical system of the projection lens 210 performs projection onto each plane, the distance to each plane, and the like. The output image generation unit 250b acquires these pieces of information as overlap information in advance, and generates an output image im0.

The output image correction unit 250c performs necessary correction processing for improving the visibility on the output image im0. That is, in a case where the output image im0 is projected as it is, distortion or the like occurs in the image projected onto each plane. Therefore, processing of correcting distortion and the like is performed.

Figure 19:
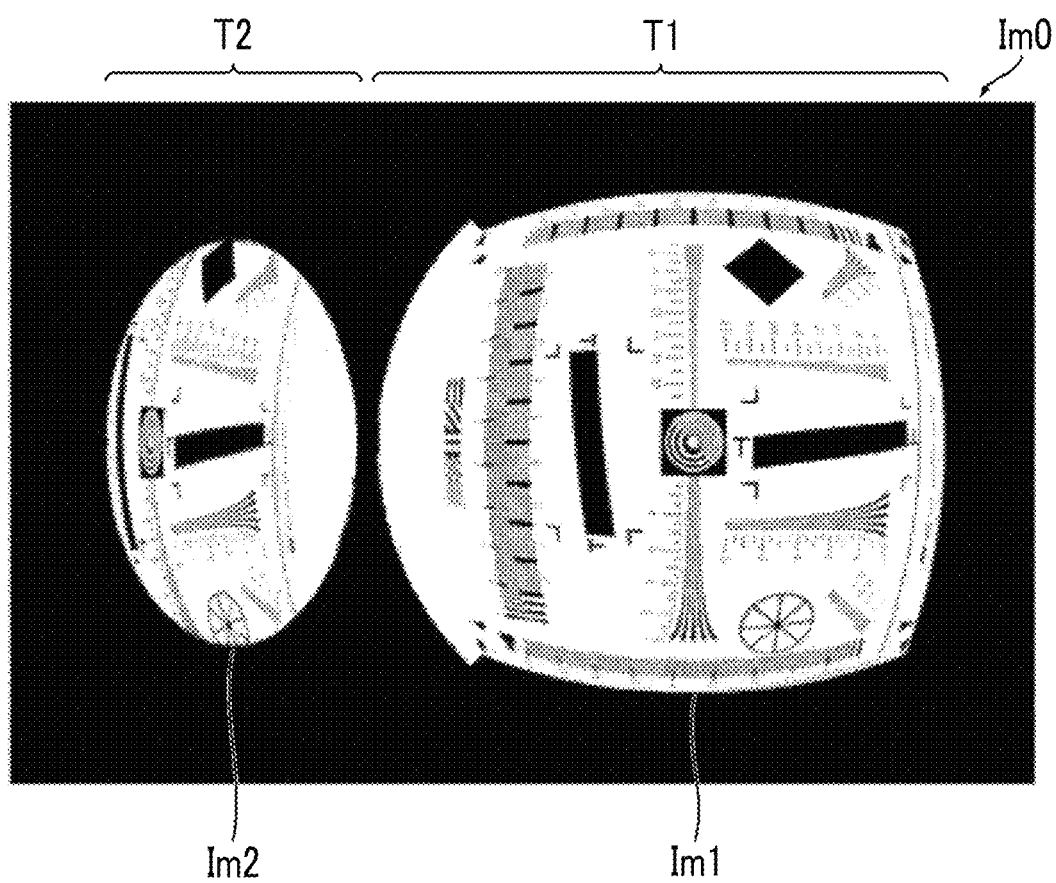
FIG. 19 is a diagram showing an example of a corrected output image.

FIG. 19 is a diagram showing an example of the corrected output image.

As shown in the drawing, necessary correction is performed on the first plane projection image im1 and the second plane projection image im2. In addition to the above distortion correction, the correction is performed by enlarging or reducing each image or the like.

<Display Control Unit>

The projection image display control unit 260 causes the image display element 220 to display the projection image (corrected output image im0) generated by the projection image generation unit 250.

[Effect]

Next, the effect of the projection apparatus 200 according to the present embodiment will be described.

In a case where an image to be projected is input to the projection image acquisition unit 240, an image to be projected onto the first plane S1 (first plane projection image im1) and an image to be projected onto the second plane S2 (second plane projection image im2) are set, and an output image im0 is generated.

In a case where the output image im0 is displayed on the image display element 220, the first plane projection image im1 is displayed in the first display region of the image display element 220. Further, the second plane projection image im2 is displayed in the second display region of the image display element 220.

The image displayed in the first display region of the image display element 220 is projected onto the first plane S1 in an enlarged manner through the projection lens 210. However, a part thereof is projected onto the second plane S2. The image displayed in the second display region of the image display element 220 is projected onto the second plane S2 in an enlarged manner through the projection lens 210. However, a part thereof is projected onto the first plane S1.

As described above, the images projected onto the first plane S1 and the second plane S2 overlap with each other. However, since the correction processing is performed, the overlapping portion does not impair the visibility.

Figure 20:
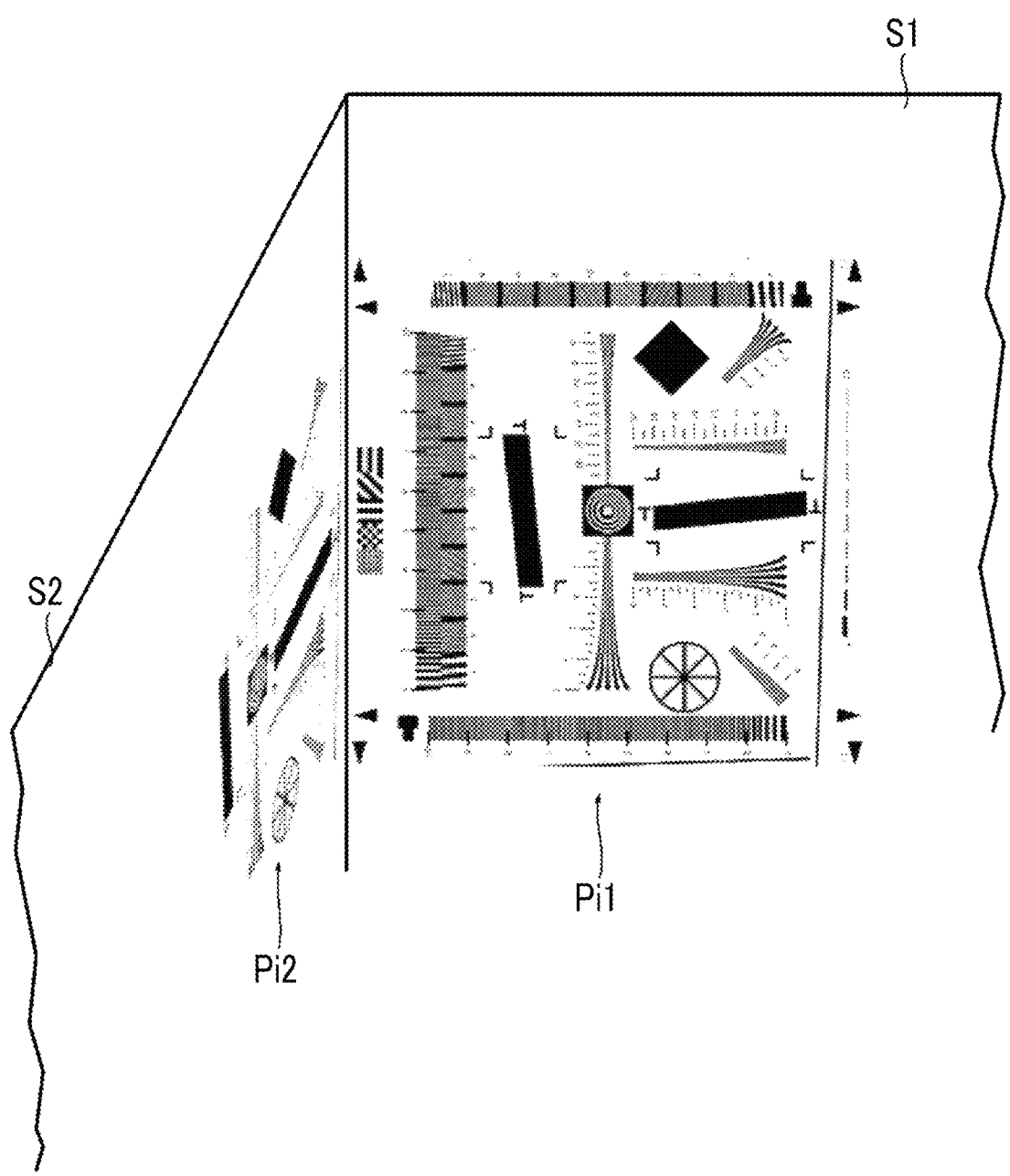
FIG. 20 is a diagram showing an example of a projected image.

FIG. 20 is a diagram showing an example of a projected image.

As shown in the drawing, the projected image Pi1 of the first plane projection image im1 is projected onto the first plane S1, and the projected image Pi2 of the second plane projection image im2 is projected onto the second plane S2.

As described above, according to the projection apparatus 200 of the present embodiment, the images can be projected onto two orthogonal planes (the first plane S1 and the second plane S2).

Modification Example

<<Projection Lens>>

Further, although the case where the projection lens comprising one second optical system is used has been described as an example in the above-mentioned embodiment, a projection lens comprising a plurality of second optical systems may be used. In such a case, in the image displayed on the image display element, a plurality of second plane projection images are displayed at a plurality of positions which are rotationally symmetric about the center of the first plane projection image as the rotationally symmetric center.

<<Image Display Element>>

The image display element is not limited to a transmissive display element, and may be a reflective display element. In such a case, the projection apparatus 200 is changed to an optical system appropriate for each display element.

Further, the image display element may shift the position of the center of the display surface in a direction perpendicular to the optical axis Z1 of the common optical system GC as necessary. Thereby, the display regions of the image display element can be used effectively.

<<Projection Image Acquisition Unit>>

The projection image acquisition unit may individually acquire an image to be projected onto each plane. That is, the projection image acquisition unit may individually acquire the image projected onto a first plane and the image projected onto a second plane.

Further, in a case of acquiring the image projected onto each plane as one image, a user may optionally set the image projected onto each plane. In such a case, the projection image setting unit 250a divides the input image on the basis of an instruction from the user, and sets an image to be projected onto each plane.

<<Generation of Output Image>>

In the above-mentioned embodiment, the output image is generated such that the images projected onto the respective planes do not overlap, but an overlapping image may be generated as the output image. In such a case, it is preferable that the processing for improving the visibility of the overlapping portion is performed on the image. For example, the luminance of the overlapping region is set to be lower than the other regions such that the projected region has substantially the same luminance as the other regions in a case where projection is performed. That is, the luminance is set to be uniform as a whole in a case where projection is performed.

In addition, as processing for no overlap, processing of cutting out the overlapping region from one image can be adopted.

<<Position Adjustment of Image Projected onto Each Plane>>

The display positions of the first plane projection image im1 and the second plane projection image im2 displayed on the image display element may be manually adjusted. Thereby, the position of the image projected onto each plane can be finely adjusted manually. In such a case, an operation unit and a display position adjustment unit are further provided. The display position adjustment unit individually adjusts the display positions of the first plane projection image im1 and the second plane projection image im2 on the basis of the operation of the operation unit.

EXPLANATION OF REFERENCES 10, 10A: imaging lens
100: imaging apparatus
110: image signal processing unit
110a: analog signal processing unit
110b: analog-to-digital converter
110c: digital signal processing unit
110d: image extraction unit
110e: image correction unit
110f: composite image generation unit
120: display unit
200: projection apparatus
210: projection lens
220: image display element
230: illumination optical system
240: projection image acquisition unit
250: projection image generation unit
250a: projection image setting unit
250b: output image generation unit
250c: output image correction unit
260: projection image display control unit
AR1: arrow indicating moving direction of first optical system G1
AR2: arrow indicating moving direction of second mirror M2
C1, C2: test chart
E1: end of first plane on overlapping side
E2: end of second plane S2 on overlapping side
F1: frame indicating region where first image overlaps with second image
F2: frame indicating region where second image overlaps with first image
G1: first optical system
G2: second optical system
G21: second-1 optical system
G22: second-2 optical system
GC: common optical system
IS: image sensor
Im: captured image
Im1: first image
Im2: second image
ImC: composite image
L11 to L14, LC1 to LC7: lenses composing first optical system
LF1, LF2: off-axis ray
M1: first mirror composing second optical system
M2: second mirror composing second optical system
M11: first mirror composing second-1 optical system
M12: second mirror composing second-1 optical system
M21: first mirror composing second-2 optical system
M22: second mirror composing second-2 optical system
OL1, OL2: overlapping region
PP: optical element
Pi1: projected image of first plane projection image
Pi2: projected image of second plane projection image
R1: first light receiving region of image sensor
R2: second light receiving region of image sensor
R21: second-1 light receiving region of image sensor
R22: second-2 light receiving region of image sensor
S1: first plane S2: second plane
Sim: image plane
St: aperture stop
T1: region for display in first display region of image display element
T2: region for display in second display region of image display element
Z1, Z2, Z21, Z22: optical axis
f: frame indicating overlapping region
im: input image
im0: output image
im1: first plane projection image
im2: second plane projection image
r1: first region of captured image
r2: second region of captured image

What is claimed is:

1. An optical system which forms subject images of a first plane and a second plane, which are discontinuous, on a continuous first light receiving region and a continuous second light receiving region, which are different, in one image sensor or enlarges projection images displayed in a continuous first display region and a continuous second display region, which are different, in one image display element so as to project the projection images onto the first plane and the second plane, the optical system comprising:
   a first optical system that performs imaging or projection on the first plane;
   a second optical system that performs imaging or projection on the second plane, includes two reflective optical elements, where at least one of the reflective optical elements has a power;
   a common optical system that forms the subject image, which is incident through the first optical system, on the continuous first light receiving region of the image sensor and forms the subject image, which is incident through the second optical system, on the continuous second light receiving region of the image sensor or that causes the projection image displayed in the continuous first display region of the image display element to be incident into the first optical system and causes the projection image displayed in the continuous second display region of the image display element to be incident into the second optical system;
   a first focus adjustment unit that moves at least a part of the optical elements of the first optical system; and
   a second focus adjustment unit that moves the reflective optical element having a power of the second optical system,
   wherein a first angle of view, at which imaging or projection is performed through the first optical system and the common optical system, overlap with a second angle of view, at which imaging or projection is performed through the second optical system and the common optical system.

2. The optical system according to claim 1, wherein assuming that an angle, which is formed between an end of the second plane on an overlapping side and an optical axis of the first optical system and the common optical system, is ω12 and that an angle, which is formed between an end of the first plane on the overlapping side and an axis orthogonal to the optical axis, is ω21, a condition of ω12+ω21>π/2 is satisfied.

3. The optical system according to claim 1, wherein the reflective optical element moved by the second focus adjustment unit has a convex reflective surface.

4. The optical system according to claim 2, wherein the reflective optical element moved by the second focus adjustment unit has a convex reflective surface.

5. The optical system according to claim 1, further comprising an angle adjustment unit that adjusts an angle of at least one of the two reflective optical elements.

6. The optical system according to claim 2, further comprising an angle adjustment unit that adjusts an angle of at least one of the two reflective optical elements.

7. The optical system according to claim 3, further comprising an angle adjustment unit that adjusts an angle of at least one of the two reflective optical elements.

8. The optical system according to claim 4, further comprising an angle adjustment unit that adjusts an angle of at least one of the two reflective optical elements.

9. The optical system according to claim 1, wherein an angle formed between the first plane and the second plane is less than π.

10. The optical system according to claim 2, wherein an angle formed between the first plane and the second plane is less than π.

11. The optical system according to claim 3, wherein an angle formed between the first plane and the second plane is less than π.

12. The optical system according to claim 9, wherein an angle formed between the first plane and the second plane is π/2.

13. The optical system according to claim 1, wherein the second optical system is disposed at each of a plurality of positions which are rotationally symmetric about an optical axis of the first optical system and the common optical system as a rotationally symmetric center.

14. The optical system according to claim 2, wherein, the optical axis of the first optical system and the common optical system referring to as a first optical axis, the second optical system has a second optical axis different from the first optical axis.

15. The optical system according to claim 14, wherein the first focus adjustment unit and the second focus adjustment unit perform focus adjustment by moving along the first optical axis and the second optical axis, respectively.

16. The optical system according to claim 1, wherein the first angle of view, at which imaging or projection is performed through the first optical system and the common optical system, partially overlap with the second angle of view, at which imaging or projection is performed through the second optical system and the common optical system.

17. A projection apparatus comprising:
   the optical system according to claim 1;
   an image display element;
   a projection image acquisition unit that acquires images to be projected; and
   a projection image generation unit that generates an image, in which the projection image projected onto the first plane is displayed in the continuous first display region and the projection image projected onto the second plane is displayed in the continuous second display region, from the images acquired by the projection image acquisition unit in a case where the image display element performs display.

18. The projection apparatus according to claim 17, wherein the projection image generation unit generates an image, in which the projection image displayed in the continuous first display region and the projection image displayed in the continuous second display region are continuous at a boundary between the first plane and the second plane, in a case where the optical system performs projection onto the first plane and the second plane.

19. An imaging apparatus comprising:
the optical system according to claim 1;
the image sensor; and
a captured image acquisition unit that acquires images formed in the continuous first light receiving region and the continuous second light receiving region of the image sensor.

20. The imaging apparatus according to claim 19, further comprising a composite image generation unit that generates a composite image obtained by combining the image formed on the continuous first light receiving region and the image formed on the continuous second light receiving region.

* * * * *